United States Patent
Raheja et al.

(10) Patent No.: US 12,526,167 B2
(45) Date of Patent: *Jan. 13, 2026

(54) REAL-TIME TONE FEEDBACK IN VIDEO CONFERENCING

(71) Applicant: GRAMMARLY, INC., San Francisco, CA (US)

(72) Inventors: Vipul Raheja, San Francisco, CA (US); Dimitrios Alikaniotis, New York, NY (US)

(73) Assignee: GRAMMARLY, INC.

( * ) Notice: Subject to any disclaimer, the term of this patent is extended or adjusted under 35 U.S.C. 154(b) by 0 days.

This patent is subject to a terminal disclaimer.

(21) Appl. No.: 18/392,849

(22) Filed: Dec. 21, 2023

(65) Prior Publication Data

US 2024/0205039 A1    Jun. 20, 2024

Related U.S. Application Data

(63) Continuation of application No. 18/180,584, filed on Mar. 8, 2023, now Pat. No. 11,894,941.

(Continued)

(51) Int. Cl.
*H04L 12/18* (2006.01)
*G06V 10/764* (2022.01)
*G06V 40/16* (2022.01)

(52) U.S. Cl.
CPC ........ *H04L 12/1831* (2013.01); *G06V 10/764* (2022.01); *G06V 40/176* (2022.01)

(58) Field of Classification Search
CPC ............. H04L 12/1831; G06V 10/764; G06V 40/176; G06V 20/40
See application file for complete search history.

(56) References Cited

U.S. PATENT DOCUMENTS

| 7,949,517 B2 * | 5/2011 | Eckert ..................... G10L 15/22 |
| | | 379/88.05 |
| 10,014,004 B2 * | 7/2018 | Khaleghi .............. H04W 12/02 |

(Continued)

FOREIGN PATENT DOCUMENTS

| AU | 2023200677 B2 | 3/2023 |
| AU | 2023202100 A1 | 4/2023 |

(Continued)

*Primary Examiner* — Michael Won
(74) *Attorney, Agent, or Firm* — Van Hoven PC; Jordan Becker

(57) ABSTRACT

A computer-implemented process is programmed to programmatically receive, using a first computer system, electronic digital data representing input time-correlated speech data and video data, determine a first text sequence corresponding to the input time-correlated speech data, the first text sequence comprising unstructured natural language text, determining syntactic structure data associated with the first text sequence, inputting the time-correlated video data and the syntactic structure data associated with the first text sequence into one or more machine learning models, the machine learning models producing an output of one or more scores for at least a portion of the time-correlated video data and first text sequence, transforming the output of one or more scores to yield and output set of summary points and suggestions, and transmitting a graphical element of the output set of summary points and suggestions for display.

20 Claims, 11 Drawing Sheets

Related U.S. Application Data

(60) Provisional application No. 63/321,295, filed on Mar. 18, 2022.

(56) References Cited

U.S. PATENT DOCUMENTS

| | | |
|---|---|---|
| 11,361,151 B1 | 6/2022 | Guberman et al. |
| 2016/0005050 A1 | 1/2016 | Teman |
| 2020/0065612 A1 | 2/2020 | Xu |
| 2020/0175961 A1 | 6/2020 | Thomson |
| 2020/0366959 A1 | 11/2020 | Pau |
| 2021/0352380 A1 | 11/2021 | Duncan |
| 2021/0407520 A1 | 12/2021 | Neckermann |
| 2022/0093101 A1 | 3/2022 | Krishnan |
| 2023/0123574 A1 | 4/2023 | Guberman et al. |

FOREIGN PATENT DOCUMENTS

| | | |
|---|---|---|
| AU | 2023202256 A1 | 5/2023 |
| JP | 2023058747 A | 4/2023 |

\* cited by examiner

REAL-TIME TONE FEEDBACK IN VIDEO CONFERENCING

PRIORITY

This application claims the benefit under 35 U.S.C. § 120 as a continuation of application Ser. No. 18/180,584, filed 8 Mar. 2023, which claims the benefit of provisional application 63/321,295, filed 18 Mar. 2022, the entire contents of which are hereby incorporated by reference for all purposes as if fully set forth herein.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2021-2022 Grammarly, Inc.

TECHNICAL FIELD

One technical field of the present disclosure is computer-implemented natural language processing. Another technical field is natural language text addition, modification, or suggestion. Another technical field relates to virtual conferencing and, more specifically, to a multimedia conferencing system for determining participant engagement. The suggested CPC classification is G06F40/40 and G06N5/04.

BACKGROUND

The approaches described in this section are approaches that could be pursued but not necessarily approaches that have been previously conceived or pursued. Therefore, unless otherwise indicated, it should not be assumed that any of the approaches described in this section qualify as prior art merely by virtue of their inclusion in this section.

As remote work becomes increasingly widespread, virtual conferencing has become an important tool in connecting businesses and individuals from across the globe. As communications are taking place through virtual means and with multiple parties, participants must overcome the challenge of holding the focus of their peers in the face of numerous distractions not only in their environments (for example, pets and/or children running around, the noise of the dishwasher running), but from their electronic devices (for example, SMS and social media notifications). Further, some participants may misinterpret conversations occurring in the virtual conference due to being unable to pick up the behavioral cues and expressions of other participants. When the communication between participants of virtual conferences is affected, the impact and productivity of the conference as a whole may be impacted.

Known computer-based online systems are capable of hosting teleconferences and videoconferences. Other systems are capable of changing audio to text to provide transcripts of the meeting to participants in the case that participants mistake the identity of the speaker or miss key parts of conversational exchange. However, these systems simply transcribe what happened in the meeting but do not have the capability to increase the efficiency of the meeting. Based on the foregoing, there is an acute need in the relevant technical fields for a computer-implemented, high-speed online system with real-time response capable of inspecting text, audio, and video from virtual conference meetings and suggesting techniques to improve participation in the virtual conference.

SUMMARY

The appended claims may serve as a summary of the invention.

DETAILED DESCRIPTION

Figure 1:
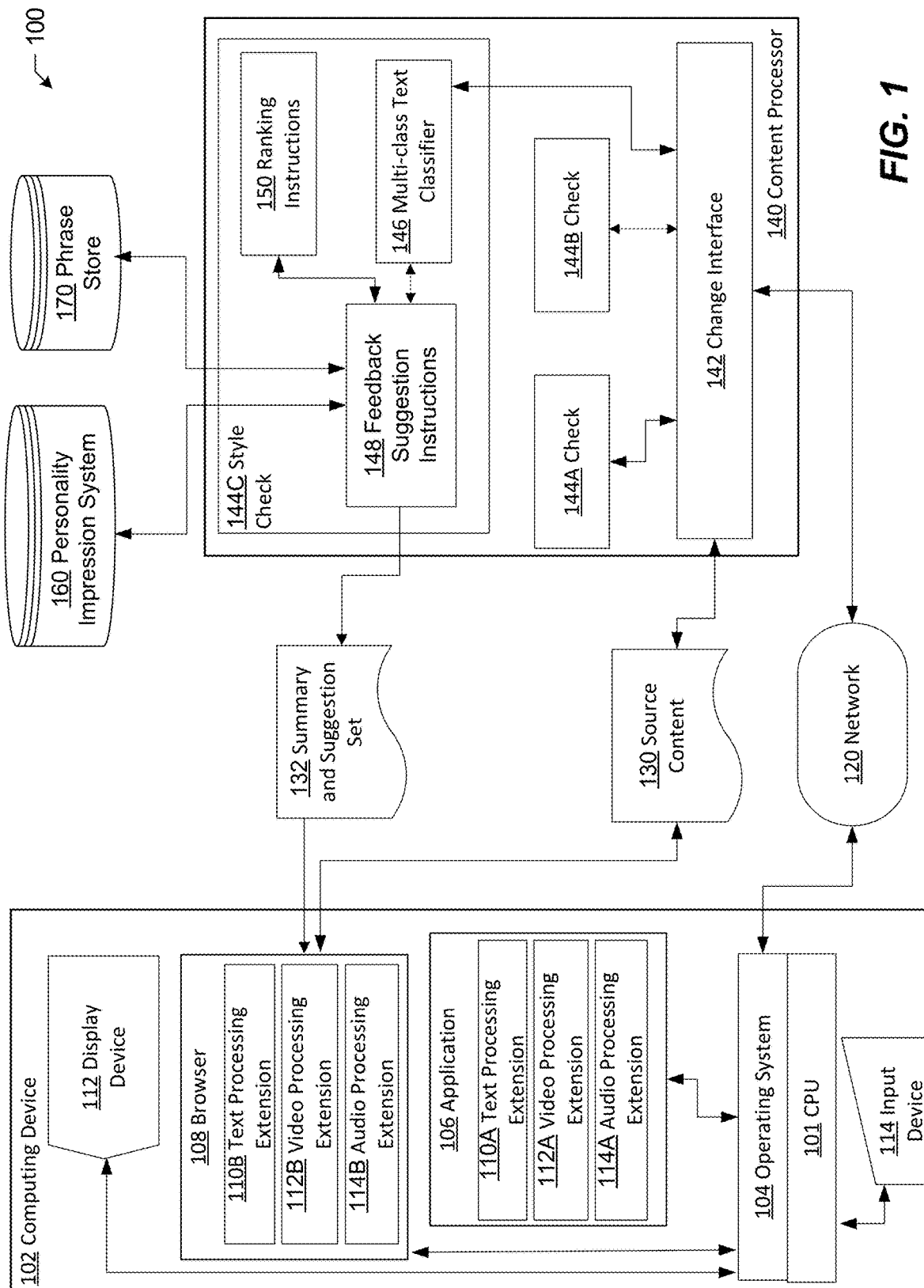
FIG. 1 illustrates a distributed computer system showing the context of use and principal functional elements with which one embodiment could be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program the computer to implement the claimed inventions at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

Embodiments are described in the sections below according to the following outline:
1. General Overview
2. Structural & Functional Overview
   2.1 Example Personality Impression System
   2.2 Expression Determination System
   2.3 Summary and Suggestion Set System
   2.4 Example Tone and Pace Detection System
   2.5 Example Video Processing System
   2.6 Example Summary and Suggestion Set Displays
   2.7 Example Personality Impression System
3. Implementation Example—Hardware Overview 1. General Overview In an embodiment, a computer-implemented process is programmed to process virtual conferencing audio, video, and text to detect a user's personality, tone and pace of speech, and expression to summarize how the user appears during the virtual conference and further displays one or more suggestions to the user, the suggestions being potentially more personable and effective within the context of virtual conferencing. Furthermore, embodiments may interoperate with a visual or graphical user interface programmed to enable users to see a summary of their behavior during the virtual conference and rank whether or not they agree with the summary.

In an embodiment, the disclosure provides a computer-implemented method comprising: using a computer system, receiving electronic digital data representing input time-correlated speech data and video data of a first user; by the computer system, determining a first text sequence corresponding to the input time-correlated speech data of the first user, the first text sequence comprising unstructured natural language text; by the computer system, determining syntactic structure data associated with the first text sequence; by the computer system, inputting the time-correlated video data of the first user and the syntactic structure data associated with the first text sequence into one or more machine-learning models, the machine-learning models producing an output of one or more scores for at least a portion of the time-correlated video data and first text sequence; by the computer system, transforming the output of one or more scores to yield and output set of summary points and suggestions; by the computer system, transmitting a graphical element of the output set of summary points and suggestions for display to the first user.

In some embodiments, the one or more scores correspond to one or more of a pitch score, a pace score, a tone score, a volume score, an emphasis score, a length-of-speech score, a length-of-pause score, a personality score, and an expression score. In some embodiments, the output set of summary points and suggestions may comprise one or more of a classification of tone, speech, personality, and/or expression. In some embodiments, the computer-implemented method may use a digital lexicon to associate the syntactic structure data for the first text sequence with a tone label.

In some embodiments, the machine learning model comprises a trained multi-class text classifier comprising a FASTTEXT classifier. In some embodiments, the machine learning model may comprise any one or more of an expression determination system and/or personality impression system. For example, the one or more expression determination systems may comprise a video-driven expression system to receive the time-correlated video data, the time-correlated video data having a plurality of frames that depict the facial expressions of the first user. As another example, the one or more personality impression systems may comprise a video-driven impression system to receive the time-correlated video data and an audio-driven impression system to receive the time-correlated audio data, the time-correlated video data having a plurality of frames that depict facial expressions of the first user.

In this description, references to "input time-correlated speech data and video data" are intended to refer, in various embodiments, to two distinct datasets independently representing speech data and video data, both of which are time-correlated and/or associated with metadata representing the same or coordinated time points, or to a single unified dataset that combines speech and video in a single set or file. In any such case, the speech data and the video data may relate to or are derived from an audiovisual recording or transmission of a particular person, individual, or user.

2. Structural & Functional Overview

FIG. 1 illustrates a distributed computer system 100, showing the context of use and principal functional elements with which one embodiment could be implemented. In an embodiment, computer system 100 comprises components that are implemented at least partially by hardware at one or more computing devices, such as one or more hardware processors executing stored program instructions stored in one or more memories for performing the functions that are described herein. In other words, all functions described herein are intended to indicate operations performed using programming in a special-purpose computer or general-purpose computer in various embodiments. FIG. 1 illustrates only one of many possible arrangements of components configured to execute the programming described herein. Other arrangements may include fewer or different components, and the division of work between the components may vary depending on the arrangement.

FIG. 1, and the other drawing figures and all of the description and claims in this disclosure, are intended to present, disclose, and claim a technical system and technical methods in which specially programmed computers, using a special-purpose distributed computer system design, execute functions that have not been available before to provide a practical application of computing technology to the problem of machine learning model development, validation, and deployment. In this manner, the disclosure presents a technical solution to a technical problem. The inventors disclaim the right or intent to cover any judicial exception to patent eligibility, such as an abstract idea, mental process, method of organizing human activity, or mathematical algorithm. Any interpretation of the disclosure or claims to cover any judicial exception to patent eligibility, such as an abstract idea, mental process, method of organizing human activity, or mathematical algorithm, has no support in this disclosure and is erroneous.

In the example of FIG. 1, a computing device 102 is communicatively coupled via a network 120 to a content processor 140. In one embodiment, computing device 102 comprises a client-type computing device such as a personal computer, laptop computer, tablet computer, smartphone, or notebook computer. For purposes of illustrating a clear example, a single computing device 102, network 120, and content processor 140 are shown in FIG. 1, but practical embodiments may include thousands to millions of computing devices 102 distributed over a wide geographic area or over the globe, and hundreds to thousands of instances of content processor 140 to serve requests and computing requirements of the computing devices.

Computing device 102 comprises, in one embodiment, a central processing unit (CPU) 101 coupled via a bus to a display device 112 and an input device 114. In some embodiments, display device 112 and input device 114 are integrated, for example, using a touch-sensitive screen to implement a soft keyboard. CPU 101 hosts operating system 104, which may include a kernel, primitive services, a networking stack, and similar foundation elements implemented in software, firmware, or a combination. Operating system 104 supervises and manages one or more other programs. For purposes of illustrating a clear example, FIG. 1 shows the operating system 104 coupled to an application 106 and a browser 108, but other embodiments may have more or fewer apps or applications hosted on computing device 102.

In particular embodiments, at runtime, one or more of application 106 and browser 108 load, or are installed with, a text processing extension 110A and 110B, a video processing extension 112A and 112B, and an audio processing extension 114A and 114B, all of which comprises executable instructions that are compatible with content processor 140 and may implement application-specific communication protocols to rapidly communicate text and audio-related commands and data between the respective extension and the text processor.

Text processing extensions 110A, 110B may be implemented as runtime libraries, browser plug-ins, browser extensions, or other means of adding external functionality to otherwise unrelated, third-party applications or software. The precise means of implementing a text processing extension 110A, 110B or to obtain input text is not critical, provided that an extension is compatible with and can be functionally integrated with a host application 106 or browser 108.

Similarly, video processing extensions 112A, 112B and audio processing extensions 114A, 114B may be implemented as runtime libraries, browser plug-ins, browser extensions, or other means of adding external functionality to otherwise unrelated, third-party applications or software. Further, the precise means of implementing a video processing extension 112A, 11B and/or audio processing extension 114A, 114B or to obtain video and/or audio is not critical, provided that an extension is compatible with and can be functionally integrated with a host application 106 or browser 108. As used herein, "video recording" may refer to video data captured by any of various electronic devices, such as a mobile phone electronic device, a tablet computer electronic device, and so forth. It is understood that video may be recorded and transmitted in real-time on computing device 102.

In some embodiments, the text processing extension 110A, video processing extension 112A, and/or audio processing extension 114A may be installed as a stand-alone application that communicates programmatically with either or both of the operating system 104 and with an application 106. For example, in one implementation, text processing extension 110A, video processing extension 112A, and/or audio processing extension 114A may execute independently of application 106 and programmatically calls services or APIs of operating system 104 to obtain video, audio, or text that has been entered in or is being entered in input fields that the application manages. Accessibility services or accessibility APIs of the operating system 104 may be called for this purpose; for example, an embodiment can call an accessibility API that normally obtains input text from the application 106 and outputs speech to speak the text to the user audibly, but uses the text obtained by the accessibility service in the processes that are described in other sections herein.

In some embodiments, each text processing extension 110A, 110B, video processing extension 112A, 112B, and/or audio processing extension 114A, 114B may be linked, loaded with, or otherwise programmatically coupled to or with one or more of application 106 and browser 108 and, in this configuration, is capable of calling API calls, internal methods or functions, or other programmatic facilities of the application or browser. These calls or other invocations of methods or functions enable each text processing extension 110A, 110B, video processing extension 112A, 112B, and/or audio processing extension 114A, 114B to detect text that is entered in input fields, audio, and/or video in windows, or panels of application 106 or browser 108. For example, application 106 or browser 108 may instruct the application or browser to delete a character, word, sentence, or another unit of text and instruct the application or browser to insert a character, word, sentence, or another unit of text. As another example, application 106 or browser 108 may instruct the application or browser to initiate a recording of audio and instruct the application or browser to suspend the recording of the audio. As another example, application 106 or browser 108 may instruct the application or browser to initiate the recording of video and instruct the application or browser to suspend the recording of the video.

Each of the text processing extensions 110A, 110B is programmed to interoperate with a host application 106 or browser 108 to detect the entry of text in a text entry function of the application or browser and/or changes in the entered text, to transmit changes in the text to content processor 140 for server-side checking and processing, to receive responsive data and commands from the text processor, and to execute presentation functions in cooperation with the host application or browser.

As one functional example, assume that browser 108 renders an HTML document that includes a text entry panel in which a user can enter free-form text describing a product or service. The text processing extension 110B is programmed to detect user selection of the text entry panel, the entry of text or changes in the text within the panel, and to transmit all such text changes to content processor 140. In an embodiment, each text processing extension 110A, 110B is programmed to buffer or accumulate text changes locally over a programmable period, for example, five seconds, and to transmit the accumulated changes over that period as a batch to content processor 140. Buffering or accumulation in this manner, while not required, may improve performance by reducing network messaging roundtrips and reducing the likelihood that text changes could be lost due to packet drops in the networking infrastructure.

A commercial example of text processing extensions 110A, 110B is the GRAMMARLY extension, commercially available from Grammarly, Inc. of Kyiv, Ukraine.

Network 120 broadly represents one or more local area networks, wide area networks, campus networks, or internetworks in any combination, using any of terrestrial or satellite, wired, or wireless network links.

In an embodiment, the content processor 140 comprises one or more server computers, workstations, computing clusters, and/or virtual machine processor instances, with or without network-attached storage or directly attached storage, located in any of enterprise premises, private data center, public data center and/or cloud computing center. Content processor 140 broadly represents a programmed server computer having processing throughput and storage capacity sufficient to communicate concurrently with thousands to millions of computing devices 102 associated with different users or accounts. Content processor 140 can be implemented using one or more virtual machine instances that provide a web application server, web applications, and supporting software that can interoperate with browser 108 and application 106 to provide the functions and services that are described herein.

For purposes of illustrating a clear example and focusing on innovations that are relevant to the appended claims, FIG. 1 omits basic hardware elements of content processor 140 such as a CPU, bus, I/O devices, main memory, and the like, illustrating instead an example software architecture for functional elements that execute on the hardware elements. Content processor 140 also may include foundational software elements not shown in FIG. 1, such as an operating system consisting of a kernel and primitive services, system services, a networking stack, an HTTP server, other presentation software, and other application software. Thus, content processor 140 may execute at a first computer, and text processing extensions 110A, 110B, video processing extensions 112A, 112B, and audio processing extension 114A, 114B may execute at a second computer.

In particular embodiments, content processor 140 may retrieve one or more video and/or audio files over network 120 from application 106 or browser 108 of computing device 102 for processing. In an embodiment, content processor 140 comprises a change interface 142 that is coupled indirectly to network 120. Change interface 142 is programmed to receive the text changes that text processing extensions 110A, 110B transmit to content processor 140, and to distribute the text changes to a plurality of different checks 144A, 144B, 144C. In an embodiment, change interface 142 may be programmed to receive audio and/or video in real-time and distributes the respective video and audio files to check 144A, 144B, and 144C. To illustrate a clear example, source content 130 of FIG. 1 represents one or more text changes that text processing extension 110B transmits to change interface 142. In an embodiment, change interface 142 is programmed to distribute each and every text change arriving from a text processing extension 110A, 110B to all of the checks 144A, 144B, 144C, which execute in parallel and/or in independent threads.

Thus, in one embodiment, the content processor 140 may be programmed to programmatically receive a digital electronic object comprising a source text, a message with the source text, an application protocol message with the source text, an HTTP POST request with the source text as a payload, or using other programmed mechanics. In various embodiments, the first computer executes a text processor that is communicatively coupled to a text processor extension that is executed at the second computer and programmatically receives the digital electronic object comprising the source text via a message initiated at the text processor extension and transmitted to the text processor; and/or the text processor extension executes in association with an application program that is executing at the second computer, the text processor extension being programmed to automatically detect a change in a text entry window of the application program and, in response, to initiate the message; and/or the text processor executes in association with a browser that is executing at the second computer, the text processor extension being programmed to automatically detect a change in a text entry widget of the browser and, in response, to initiate the message.

Each of the checks 144A, 144B, 144C is programmed to execute a different form of checking or processing of the content that has arrived. Example functions that check 144A, 144B, and 144C may implement include grammar checking, tone detection, pace detection, translation, expression determination, and personality impression. In an embodiment, check 144C is programmed as a phrase check, and therefore it is also denoted "phrase check 144" in this description. In an embodiment, phrase check 144 comprises a multi-class text classifier coupled to phrase suggestion instructions 148, which are coupled to ranking instructions 150; however, other machine learning models can be used. For example, an embodiment may use a number of individual text classifiers ensembled together, or targeted rules may be programmed to find relevant words and then coupled to a classifier to approve or reject whether the instance of a word is correct, thus using a coarse rule followed by ML-based filtering.

Furthermore, phrase check 144C is coupled to or may access a phrase store 170, which may be integrated with content processor 140 or implemented as separate storage. In an embodiment, phrase store 170 comprises a database, flat file system, object store, or another digital data repository that stores a large number of textual phrase suggestions in association with category values or tags that specify a category or type of communication, text, or document in which the suggestions could be substituted. Thus, phrase check 144 and/or content processor 140 may be programmed for evaluating each particular source text unit among the plurality of source text units using a trained multi-class text classifier machine learning model and receiving a classification output from the multi-class text classifier that classifies each particular source text unit as a particular class of phrase among a plurality of possible classes of phrases. As further described herein, in an embodiment, phrase suggestion instructions 148 are programmed, in part, to output a suggestion set 132 to transmit to text processing extension 110B.

In particular embodiments, content processor 140 is coupled to, or may access, personality impression system 160, which may be integrated with content processor 140 or implemented as separate storage. In an embodiment, personality impression system 160 may comprise a database, flat file system, object store, graph database, one or more machine learning models, or another data repository that stores a large number of auditory and visual evaluations in association with category values or tags that specify a specific category or type of communication in which the suggestions could be substituted. Thus, any of checks 144A, 144B, 144C and/or content processor 140 may be programmed for evaluating each particular source audio and/or video file among the plurality of audio and/or video files using a trained multi-class text classifier machine learning model and receiving one or more classification outputs.

2.1 Example Personality Impression System

Figure 2:
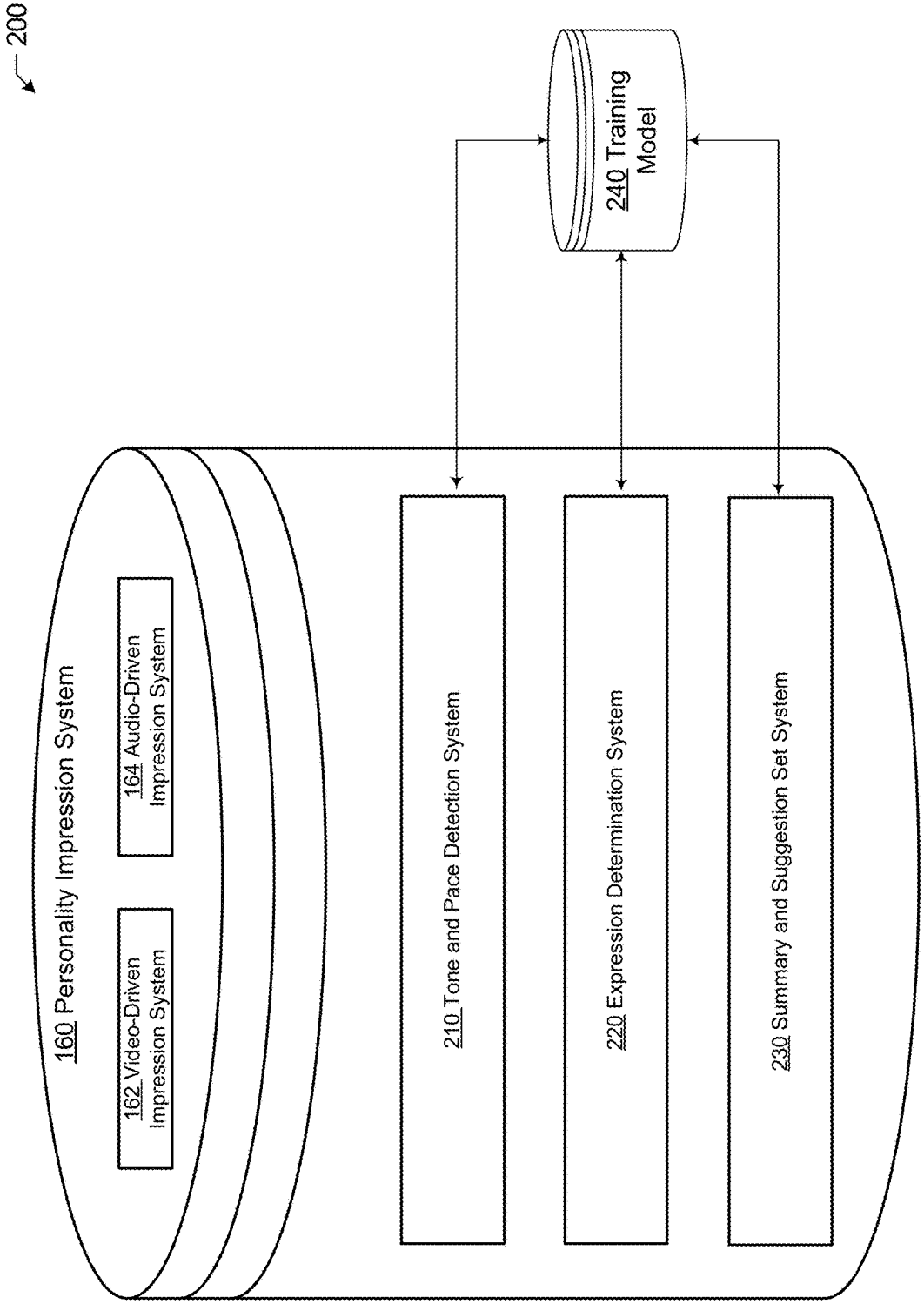
FIG. 2 illustrates an example computer system showing the context of use and principal functional elements with which one embodiment of the personality impression system could be implemented.

FIG. 2 illustrates an example computer system 200 showing the context of use and principal functional elements with which one embodiment of the personality impression system 160 could be implemented. FIG. 2 illustrates only one of many possible arrangements of components configured to execute the programming described herein. Other arrangements may include fewer or different components, and the division of work between the components may vary depending on the arrangement.

In particular embodiments, personality impression system 160 may be programmed to retrieve electronic digital data representing video, audio, and/or text from a user from the respective text processing extensions 110A or 110B, video processing extensions 112A or 112B, and/or audio processing extensions 114A or 114B. In particular embodiments, the input electronic digital data may consist of time-correlated speech (for example, audio) and video data of a first user. For example, a user of computing device 102 may be engaged in a videoconference with one or more additional participants, and content processor 140 may identify the user of computing device 102 as a first or primary user. In particular embodiments, computing device 102 may record participant speech and video of participants engaged in the video conference and collect text input provided by users in a videoconference chat functionality through one or more sensors (for example, camera, microphone). In particular embodiments, CPU 101 may input the recorded speech, video, and/or text into application 106 and/or browser 108.

In particular embodiments, recorded speech (for example, audio) and recorded video captured by computing device 102 may be time aligned (for example, time-correlated) through the use of one or more timestamps. In particular embodiments, browser 108 and/or application 106 may output electronic data from each respective processing extension (for example, text processing extension 110A, 110B, video processing extension 112A, 112B, and/or audio processing extension 114A, 114B) and transmit the electronic data via network 120 to content processor 140 for further processing. For example, Network 120 may include one or more local area networks, wide area networks, campus networks, or internetworks in any combination, using any of terrestrial or satellite, wired, or wireless network links. In some embodiments, content processor 140 may transmit the electronic data to personality impression system 160.

In particular embodiments, personality impression system 160 may be programmed to contain a plurality of modules and/or systems for processing and separating the audio and video through video-driven impression system 162 and audio-driven impression system 164. For example, audio and video data may be evaluated and processed by one or more modules and/or systems, including but not limited to tone and pace detection system 210, expression determination system 220, and summary and suggestion set system 230.

In particular embodiments, each of tone and pace detection system 210, expression determination system 220, and summary and suggestion set system 230 may be communicatively coupled to one or more machine-learning training models 240. Although the description of FIG. 2 discusses a singular machine-learning training model 240, this disclosure contemplates any suitable number of machine-learning training models.

In particular embodiments, the personality impression system 160 may be programmed to analyze the voice and audio input using natural-language understanding. In particular embodiments, the personality impression system 160 may be programmed to create and store a user profile comprising both personal and contextual information associated with the user. For example, the personality impression system 160 may be programmed to create and store a user profile of both the primary user (for example, the first user) of computing device 102 and one or more secondary users or participants in the virtual conference. For example, the audio-driven impression system 164 may be programmed to process input speech to identify one or more audio segments in which a first user is speaking and to store the segmented audio in a user profile of the first user. As another example, the audio-driven impression system 164 may be programmed to process input speech to identify one or more segments where one or more secondary participants are speaking and store the segmented audio in the respective profiles of each secondary participant. In some embodiments, the user profiles may store a record of relationships with other users of the virtual conference. Similar to the audio-driven impression system 164, video-driven impression system 162 may be programmed to process video data to identify a first user and secondary participants of the virtual conference, storing the video data in each respective user profile.

Tone and Pace Detection System

In particular embodiments, speech processed by the audio-driven impression system 164 may be transmitted to tone and pace detection system 210. For example, tone and pace detection system 210 may be programmed to process the speech input to extract features from the speech input. Tone and pace detection system 210 may be programmed to generate tone data from digital audio of speech from the user and/or one or more participants of the virtual conference. As described in more detail in relation to FIG. 3A, FIG. 3B, FIG. 3C, embodiments of tone and pace detection system 210 may be programmed to receive, under digital program control, electronic digital data that represents speech data processed into a text sequence in a first language, where the text sequence may include unstructured natural language text. "Unstructured text," as used herein, may refer to text that lacks metadata or otherwise cannot readily be indexed or mapped onto database fields or objects. Unstructured text may include but is not limited to user-generated digital data, such as transcriptions of a conversation within the virtual conference.

In particular embodiments, tone and pace detection system 210 may be programmed to generate a determination and/or prediction of a tone by inputting syntactic structure data for the text sequence into a machine-learning model (for example, machine-learning training model 240), and the machine-learning model may produce output that is used alone or in combination with other tone and pace prediction mechanisms to produce a tone and pace score. For example, personality impression system 160 may be programmed to interface with machine-learning training model 240, and the machine-learning training model 240 may be trained using tone predictions made for text sequences analyzed during prior uses of the personality impression system 160. In some embodiments, machine-learning training model 240 may be a multi-modal classification model trained using acoustic and textual features of speech utterances. In some embodiments, machine-learning training model 240 may be a multi-modal classification model trained using facial expressions from video recordings.

In particular embodiments, in the case where there is a limited amount of labeled data, training model 240 may be programmed to retrieve a personality recognition dataset to be combined with an internal dataset for model training. For example, training model 240 may be programmed to use a semi-supervised approach to train the personality impression system 160. In some embodiments, based on processed output by tone and pace detection system 210, expression determination system 220, and summary and suggestion set system 230, the personality impression system 160 may be programmed to categorize the user's personality with emotion and/or personality labels such as happy, sad, neutral, angry, surprise, confident, bored, uninterested, interested, optimistic, joyful, friendly, etc. Although this disclosure lists the aforementioned labels as examples of emotions and/or personality labels, this disclosure contemplates any suitable personality labels.

In particular embodiments, tone and pace detection system 210 may be programmed to operate in real-time while the first user is speaking in the virtual conference. For example, each instance of the first user speaking throughout the duration of the virtual conference may correspond to a text sequence. For example, a particular tone and pace score produced by the tone and pace detection system 210 may be associated with a first text sequence. The tone and pace score may be indicative of the degree to which a particular type of tone and/or pace is present or absent in at least a portion of the first text sequence. As another example, tone and pace detection system 210 may determine a pitch score, a pace score, a tone score, a volume score, an emphasis score, a length-of-speech score, a length-of-pause score, a personality score, an expression score, or any other suitable score.

In creating and storing training data for the machine-learning training model 240, a secure storage process may be used so that the contents of the text sequences cannot be determined in the event of a security breach. In an embodiment, a variable length string that includes the text sequence is input into a cryptographic hash function, and the output of the cryptographic hash function is combined with the corresponding tone score(s) and stored in computer memory as training data that may be used to train the machine-learning training model 240 or to adapt the machine-learning training model 240 to, for example, a particular domain.

In particular embodiments, tone and pace detection system 210 may be programmed to use a reference set of tone labels that may be stored in a reference data store. In some embodiments, the reference set of labels includes tone labels and emotion labels, and the tone and pace detection system 210 may initiate a different set of processing depending on whether a tone or an emotion is detected. For example, tone and pace detection system 210 may use detected emotions to help determine the predicted tone of the user or one or more secondary participants in the virtual conference. In other embodiments, detected emotions may be processed the same way as detected tones. An example of a reference set of tone labels is shown in Table 1 below.

TABLE 1

Examples of Tone and Emotion Labels.

| Classification | Label |
| --- | --- |
| Tone/Emotion | Joyful |
| Emotion | Confident |
| Emotion | Worried |
| Emotion | Surprised |
| Emotion | Sad |
| Tone | Forceful |
| Tone | Compliant |
| Tone | Appreciative |
| Tone | Accusatory |
| Tone | Confused |
| Tone | Concerned |

For example, tone and pace detection system 210 may be programmed to extract features such as duration, frequency, tone, and pace of a user's speech to determine an overall tone and/or pace. For example, for a particular first text sequence corresponding to the audio speech sequence, the tone and pace detection system 210 may be programmed to produce a tone score for each of the tone labels in a reference set of tone labels. A set of tone labels is associated with the particular text sequence. For example, tone labels having the top k tone scores, where k is a positive integer or a percentage, for instance, may be included in the set of tone labels.

The tone score for a particular text sequence and a particular tone may be a probabilistic value between 0 and 1, which indicates a mathematical likelihood that the text sequence contains the particular tone. A particular tone label may have a score of zero or nearly zero with respect to a particular text sequence if the tone and pace detection system 210 predicts that the particular tone label is not present in the particular text sequence. Conversely, a particular tone label may have a score of one or nearly 1 with respect to a particular text sequence if tone and pace detection system 210 predicts that the particular tone label is very likely present in the particular text sequence.

In some embodiments, a tone score may include both a numerical value and a sign, where the sign serves as an indication of tone intensity and the numerical value indicates a polarity of the tone. For instance, the tone score may be a negative integer if the predicted tone is negative, a positive integer if the predicted tone is positive, or zero if the predicted tone is neutral. Tone scores may be defined using a range that includes at least one negative integer and/or at least one positive integer and zero. As an example, tone and pace detection system 210 may be programmed to output tone scores in a range of integers such as between −5 and +5, where −5 indicates a very negative tone, zero indicates a neutral tone, and +5 indicates a very positive tone. The range of valid tone scores may be determined based on the requirements of a particular design or implementation of tone and pace detection system 210 and is not limited to these illustrative examples.

In some embodiments, a combination of rules-based analysis and machine learning-based analysis may be used and programmed to improve the accuracy of tone predictions. In some embodiments, a combination of sentence level and conversation level tone analyses are used and programmed to generate tone predictions. In some embodiments, a set of candidate tone predictions is presented to the user, and user feedback on the set of candidate tone predictions is incorporated into a machine-learned model in order to improve the future output of the personality impression system 160. In some embodiments, tone and pace detection system 210 may be programmed to evaluate the text sequence to compute a tone score using dependency relation data associated with word pairs or phrases of the first text sequence, where the dependency relation data is determined by a syntactic structure data of the first sequence, as discussed further in FIG. 3B.

In particular embodiments, speech data may be processed to a corresponding sound waveform and transmitted, under digital program control, to tone and pace detection system 210 as electronic digital data that represents speech data. In particular embodiments, the electronic digital data may be processed and categorized by the tone and pace detection system 210 into a series of intervals. For example, the intervals may include categories such as slow, normal, and fast. For example, in the case that the user's speech is categorized into the "slow pace" interval, information regarding the pace as "slow" may be used by the personality impression system 160 to determine a user's mood and personality. In this example, personality impression system 160 may be programmed to interpret the slow pace of the user's speech as sad or lacking confidence. An example of a reference set of pace classifications and labels is shown in Table 2 below.

TABLE 2

Examples of Pace Classifications and Emotion Labels.

| Pace Classification | Label |
|---|---|
| High | Excited |
| High | Confident |
| High | Nervous |
| Normal | Engaged |
| Normal | Confident |
| Normal | Compliant |
| Slow | Sad |
| Slow | Confused |
| Slow | Lacking confidence |

2.2 Expression Determination System

In particular embodiments, tone and pace detection system 210 may be programmed to compute both tone and pace scores, and the respective scores may be used in combination or alone by personality impression system 160 to determine a prediction of the user's personality impression. In particular embodiments, video data may be processed by video-driven impression system 162 and transmitted to expression determination system 220. In some embodiments, the video data may be segmented into a plurality of still frames. For example, a still frame may be captured in intervals of 50 milliseconds.

After segmentation of the video data, the still frames may be transmitted to the machine-learning training model 240 for further processing. In some embodiments, machine-learning training model 240 may be a multi-modal classification model trained using facial expressions. Machine-learning training model 240 may be programmed to perform a variety of processing techniques to configure and format the video data stream. For example, machine-learning training model 240 may perform gamma correction processes, noise filtering, subtraction of particular colors of image data, compression, reconstruction, and/or any other suitable technique for image processing. In some embodiments, machine-learning training model 240 may include one or more image classifiers, including but not limited to a Neural Network, Support Vector Machine (SVM), Bayesian, and/or any suitable image classifier.

Once trained, the machine-learning training model 240 may be programmed to process still frames to extract facial features of participants to the virtual conference and generate confidence values corresponding to each extracted facial feature. For example, facial features may include dimensions of the participant's face (for example, height and width), as well as landmark features such as eyes, nose, mouth, eyebrows, etc. In this example, through the identification of landmark features of each participant, the machine-learning training model 240 may evaluate one or more regions of the face to detect expressions in real-time. For example, the machine-learning training model 240 may detect that the first user is furrowing their brows and has a downturned mouth, in which case the machine-learning training model 240 may perform statistical mapping of each identified expression and generate one or more confidence values when attributing personality traits and/or emotions to the user's expression.

In some embodiments, machine-learning training model 240 may retrieve a plurality of datasets of facial expression data from one or more data stores, public databases, and/or another suitable method of obtaining facial expression data. For example, the machine-learning training model 240 may be trained on one or more convolutional neural networks such as Xception, GoogLeNet, NASNET-large, DenseNet-201, DarkNet-53, and/or any suitable image classifier. Through classification, the expression determination system 220 may assign one or more expressions to the user, including but not limited to anger, disgust, happy, neutral, sad, surprised, distracted, etc.

In particular embodiments, expression determination system 220 may preprocess facial expression data and identify a plurality of expression categories.

Next, the expression determination system 220 may receive, under digital program control, electronic digital data that represents video data of the virtual conference. In some embodiments, expression determination system 220 may process the electronic digital data in two sets, the first set being electronic digital data corresponding to the first user, and the second set being electronic digital data corresponding to the participants in the virtual conference. For example, the expression determination system 220 may identify an expression of the first user while they are speaking in the virtual conference (for example, the first user appears to have a confident expression), and further identify the expressions of the plurality of participants in response to the first user (for example, engaged and listening, bored and not listening). An example of a reference set of expression determination characteristics is shown in Table 3 below:

TABLE 3

Examples of Expression Characteristics and Emotion Labels

| Expression Characteristic | Label |
|---|---|
| Raised eyebrow(s) | Confused |
| Raised eyebrow (s) | Surprised |
| Open mouth | Worried |
| Open mouth | Excited |
| Closed eyes | Bored |
| Closed eyes | Forceful |
| Neutral | Compliant |
| Downturned eyebrow(s) | Accusatory |
| Downturned eyebrows | Concerned |

In particular embodiments, expression determination system 220 may be programmed to produce an expression score for each of the expression labels in a reference set of expression labels. For example, expression labels having the top k expression scores, where k is a positive integer or percentage, for instance, may be included in the set of expression labels. The expression score for the particular video segment and a particular expression may be a probabilistic value between 0 and 1, which indicates a mathematical likelihood that the user is demonstrating a particular expression. A particular expression label may have a score of zero or nearly zero with respect to a particular expression if expression determination system 220 predicts the user is not demonstrating the particular expression. Conversely, a particular expression may have a score of 1 or nearly 1 with respect to a particular expression if expression determination system 220 predicts that the user is very likely demonstrating the particular emotion.

In some embodiments, an expression score may include both a numerical value and a sign, where the sign serves as an indication of the expression intensity and the numerical value indicates a polarity of the expression. For instance, the expression score may be a negative integer if the predicted expression is negative, a positive integer if the predicted expression is positive, or zero if the predicted expression is neutral. Expression scores may be defined using a range that includes at least one negative integer and/or at least one positive integer and zero. As an example, expression determination system 220 may output expression scores in a range of integers, such as between −5 and +5, where −5 indicates a very negative expression, zero indicates a neutral expression, and +5 indicates a very positive expression. The range of valid expression scores may be determined based on the requirements of a particular design or implementation of expression determination system 220 and is not limited to these illustrative examples.

2.3 Summary and Suggestion Set System

In particular embodiments, summary and suggestion set system 230 may be programmed to retrieve output tone, pace, and expression scores to generate a summary set and a suggestion set for display to the user of computing device 102. In some embodiments, summary and suggestion set system 230 may be programmed to compile a plurality of output tone scores, pace scores, and expression scores and transmit the compiled scores to machine-learning training model 240. For example, machine-learning training model 240 may process and match the input scores to a plurality of personality impressions. The plurality of personality impressions may be transmitted to content processor 140 as a "summary," and the summary may be presented to a user via a graphical user interface. For example, in real-time, as the first user is speaking in the virtual conference, the machine-learning training model 240 may be programmed to retrieve and compile one or more scores as output by tone and pace detection system 210 and expression determination system 220, and a summary may be generated based on the compiled scores. Or the personality impression system 160 may be programmed to identify that the first user is speaking at a fast pace, has downturned or furrowed eyebrows, and is speaking in a tone indicative of anger. In this example, the machine-learning training model may classify the combination of these expressions and predict that the user is angry or worried.

In particular embodiments, the summary and suggestion set system 230 may be programmed to transmit instructions to content processor 140 to display to the first user via a graphical user interface, a text box containing the prediction. In this case, the text box may contain summary text such as "You appear to be angry or worried," as well as a suggestion set such as "Slow down the pace of your speech."

For example, the user may rate and/or vote on the one or more personality impressions within the summary. The user's ratings and/or votes received via the graphical user interface may be input as user feedback to the personality impression system 160, and the user feedback may further train the machine learning training model 240. In particular embodiments, based on the user's feedback to the output summary, personality impression system 160 may transmit one or more of a suggestion set to be presented to the user via a graphical user interface. The summary and suggestion set system 230 are further discussed in connection with FIG. 5, FIG. 6, FIG. 7.

2.4 Example Tone and Pace Detection System

Figure 3A:
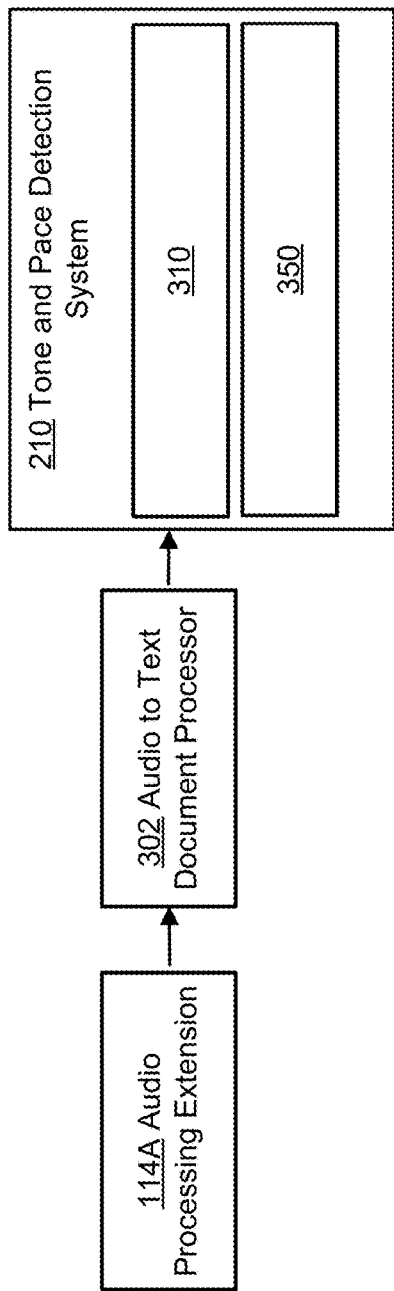
FIG. 3A, FIG. 3B, and FIG. 3C illustrate example flow diagrams of a computer-implemented process of performing tone and pace detection on input audio.
Figure 3B:
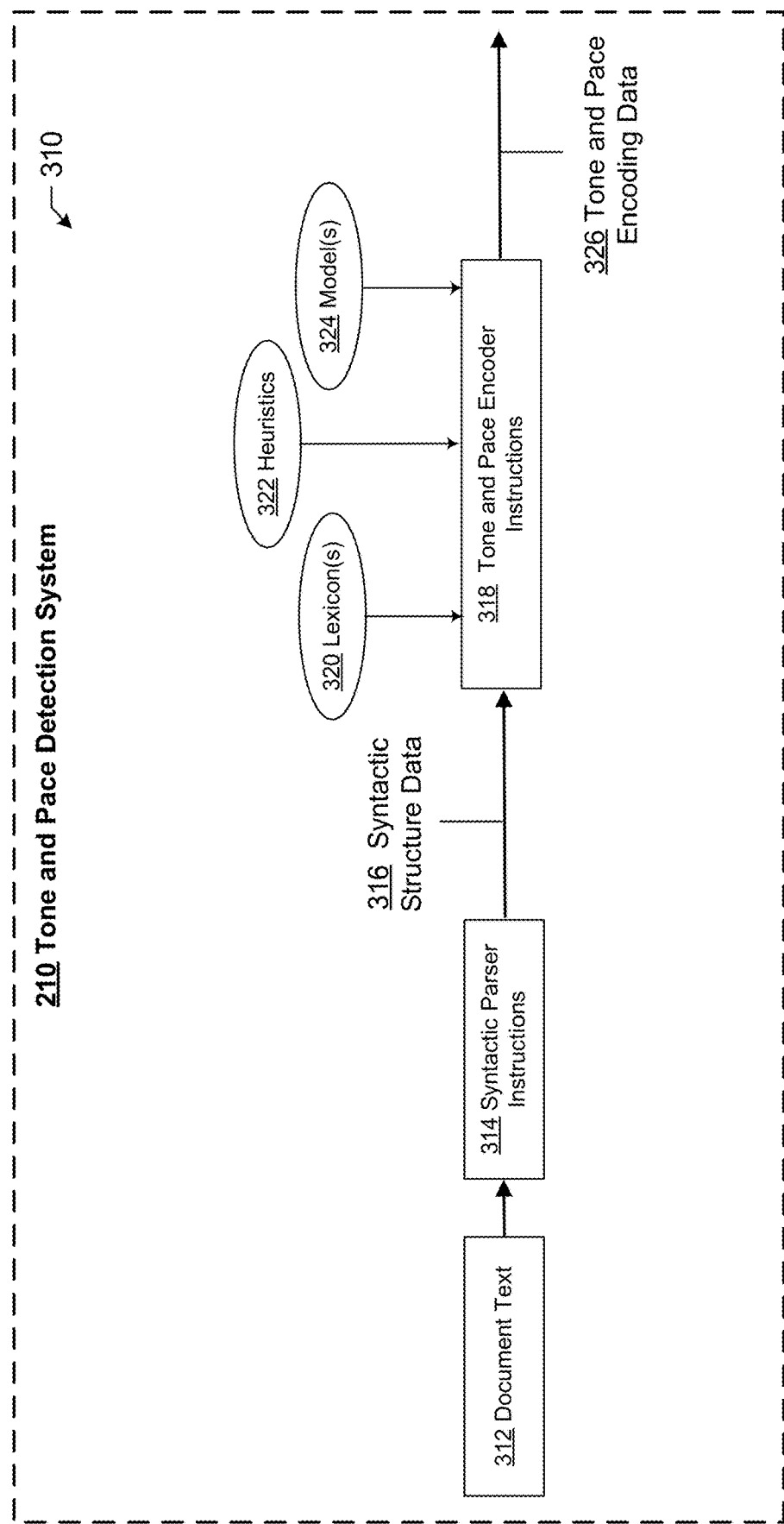
Figure 3C:
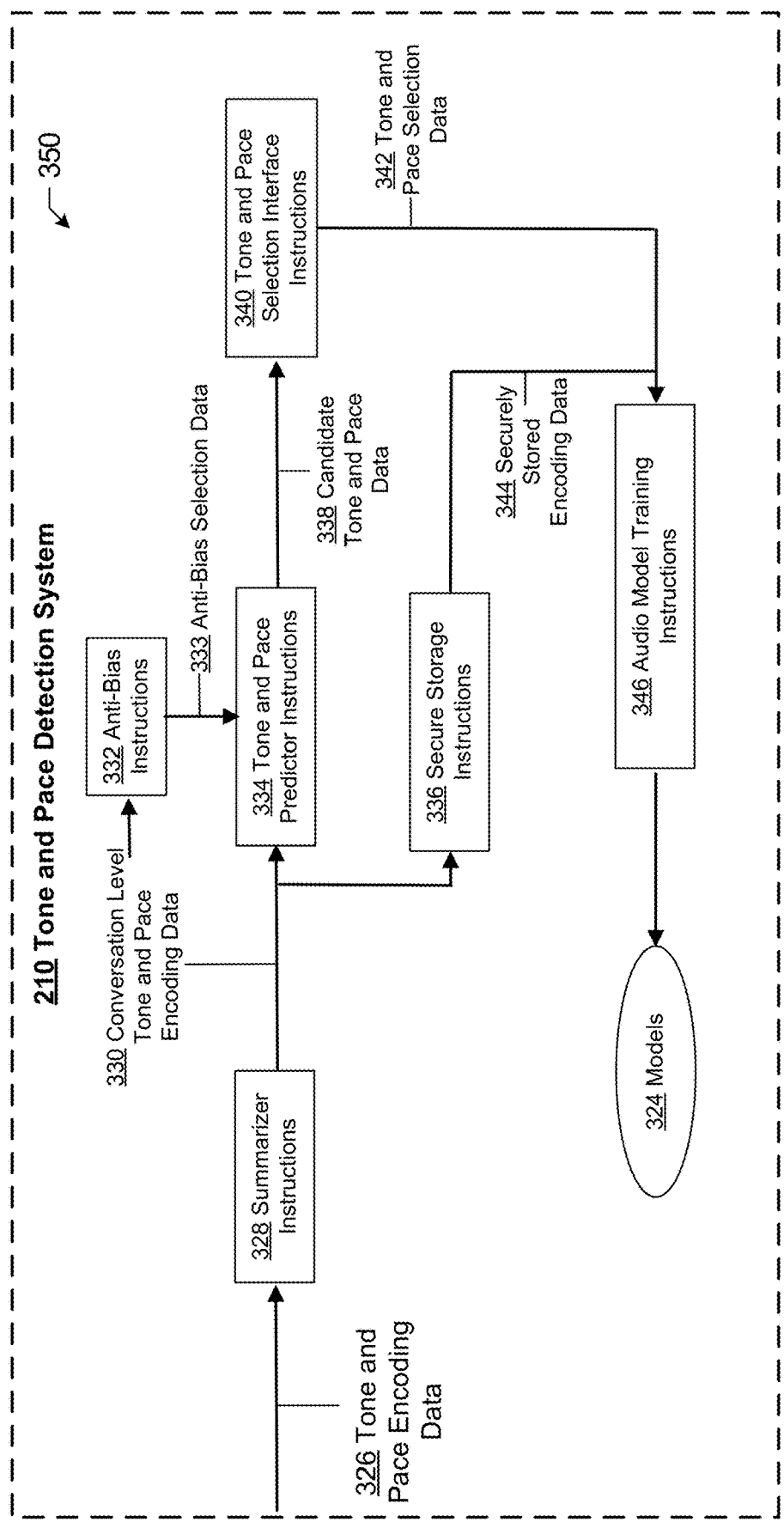

FIG. 3A, FIG. 3B, FIG. 3C illustrate example flow diagrams 310, 350 of a computer-implemented process of performing tone and pace detection on input audio.

Referring first to FIG. 3A, in an embodiment, diagram 300 may begin at audio processing extension 114A. Although this disclosure discusses the process beginning at audio processing extension 114A, alternatively, the process may begin with audio processing extension 114B. Next, at step 302, the audio may be received and processed into a text document. In some embodiments, content processor 140 may be implemented as a back-end server and may be programmed to distribute the text to a plurality of modules that are programmed to execute multiple types of checks and processes on the text. In some embodiments, content processor 140 may transmit one or more text documents as generated by the user's speech at step 302 to tone and pace detection system 210.

FIG. 3B illustrates example flow diagram 310 of a computer-implemented process of performing tone and pace detection on input audio. In particular embodiments, as demonstrated by diagram 310 in FIG. 3B, involves the execution by at least one processor of computer code including syntactic parser instructions 314 and tone and pace encoder instructions 318. Instructions 314, 318 may operate on digital data including portions of document text 312, using one or more digital lexicons 320 and/or one or more digital heuristics 322 and/or one or more digital models 324. Instructions 314, 318 as well as portions of digital lexicons 320, digital heuristics 322, and/or digital models 324 may be written using any suitable computer programming language, such as Python, JAVASCRIPT, C, C++, and/or software development framework. For example, digital data, including portions of document text 312, digital lexicons 320, digital heuristics 322, and digital models 324 may be stored in a searchable database and/or a structured data file such as an XML (extensible Markup Language) file. In an embodiment, portions of document text 312, digital lexicons 320, digital heuristics 322, and digital models 324 may be stored in a reference data store.

In particular embodiments, syntactic parser instructions 314 may be programmed to receive and process document text 312. Document text 312 may include one or more text sequences. In some embodiments, document text 312 may be received by a graphical user interface, such as a text editor or a front-end of a message authoring application. In particular embodiments, during the processing of document text 312, syntactic parser instructions 314 may be programmed to extract a set of features from the first portion of the text sequence. Examples of the text sequence may include raw features such as n-grams, tokens, words, word pairs, phrases, and chunks of the text sequence. Syntactic parser instructions 314 be programmed to analyze the raw features using, for example, a statistical model, and produces computed features, such as part-of-speech tags and dependency relation data, associated with the raw features. For example, computed features may include dependency relation data associated with particular word pairs or phrases of the first portion of the text sequence. Computed features may also include part of speech data such as annotations that identify the part of speech of a particular word of the text sequence. Computed features may be associated with raw features by, for example, annotating portions of the raw features with the corresponding computed features. As used herein, raw features and computed features may be referred to collectively as features.

In particular embodiments, syntactic parser instructions 314 may be programmed to produce and output sentence-level syntactic structure data and/or conversation-level syntactic structure data. At the sentence level, syntactic parser instructions 314 may be programmed to repeat parsing operations for portions of document text 312 until syntactic parser instructions 314 detect an end of document and/or conversation. Examples of end of document and/or conversation signals include but are not limited to periods and other punctuation marks, blank spaces, tab signals, and new paragraph signals that are not followed by additional text.

In particular embodiments, syntactic structure data 316 may be transmitted or otherwise provided as input to tone and pace encoder instructions 318. Tone and pace encoder instructions 318 may be programmed to receive and process syntactic structure data 316 at a sentence and/or conversation level. As an example, syntactic structure data 316 applies to at least one machine-stored rule and a machine-learning training model 240. Using the at least one machine-stored rule and the machine-learning training model 240, tone and pace encoder instructions 318 may be programmed to compute a set of tone scores one or more portions of the text sequence. In an embodiment, the machine-stored rules used by tone and pace encoder instructions 318 may be implemented using lexicons 320 and heuristics 322 while the first machine-learned model is implemented using a model 324.

An example of a lexicon 320 is a searchable database or table that stores mappings between raw text features, such as words, and corresponding tones. An example of a mapping of a raw text feature to a tone is "great:joyful," where "great" is the raw text feature (a word), "joyful" is the tone, and ":" indicates the mapping. Another example of a lexicon 320 is a searchable database or table the stores mappings of raw text features, such as words, word pairs or phrases, with indications of tone intensity. An example of a mapping of a raw text feature to a tone intensity is "good:optimistic:+2," or "great:optimistic:+4," where the tone intensity is indicated by a numerical value. That is, both "good" and "great" map to the tone, "optimistic," but the tone intensity is higher for "great."

In an embodiment, tone and pace encoder instructions 318 may be programmed to use one or more of a tone lexicon, a tone intensity lexicon, pace lexicon, and/or pace intensity lexicon. During processing of a text sequence, when tone and pace encoder instructions 318 detects a word that is in a lexicon 320, tone and pace encoder instructions 318 may annotates the text sequence with the tone and/or tone intensity indicated by the lexicon 320.

An example of a heuristic 322 is a machine-implemented rule that, when executed by a processor, may determine when or whether a particular tone or a particular tone intensity is associated with a particular portion of a text sequence. In an embodiment, heuristics 322 may be configured to detect certain combinations of tones and tone intensities based on aspects of the syntactic structure of a text sequence. An example of a heuristic 322 is "the presence of the word 'very' in a text sequence modifies the intensity of a detected tone or emotion." Another example of a heuristic 322 is "the presence of the word 'not' in a text sequence reverses the sentiment (or polarity) of the text sequence." Yet another example of a heuristic 322 is "a particular tone (such as 'appreciation') is not associated with a text sequence unless the text sequence has a particular syntactic structure." A heuristic 322 may specify a word-level rule and/or a phrase-level rule. A heuristic 322 may be made up of a set of rules or a single rule.

An example of model 324 is a sentence-level tone prediction model that has been trained using a corpus of text sequences that have been annotated with tone and/or tone intensity labels. A model 324 can be trained with samples of text sequences obtained from a publicly available data source that have been hand-labeled with tone and/or tone intensity annotations. Alternatively or in addition, a model 324 can be trained or adapted using a reinforcement learning approach as described herein.

In an embodiment, a model 324 is a machine-learned statistical model such as a logistic regression model. That is, a logistic regression algorithm is applied to the training data to create model 324. In one version, model 324 is a binary classifier created using an open-source machine learning library such as the "vowpal wabbit" framework. In one particular embodiment model 324 has a configuration that includes the following settings: individual learning rate, feature-normalized updates, safe/importance-aware updates, a logistic loss function, a generalized logistic function, max order of ngrams set to a positive integer less than 10 or less than 5, and max order of skip-grams set to a positive integer less than ten or less than five and greater than the max order of n-grams value. In other embodiments, the parameter configuration of model 324 may be adapted to the requirements of a particular design or implementation of the system.

In particular embodiments, in the case of a reinforcement learning approach, a set of candidate tones may be presented to a user via a graphical user interface, and the user may rate or vote on one or more of the candidate tones through the graphical user interface. The user's ratings or votes received via the graphical user interface may be combined with the text sequence and/or the syntactic structure of the text sequence, using, for example, a concatenation function. For example, the combination of user feedback data and the text sequence and/or the syntactic structure data may be used as training data for the model 324. In other embodiments, other forms and sources of training data may be used.

In particular embodiments, tone and pace encoder instructions 318 may be programmed to output tone and pace encoding data 326. In an embodiment, tone and pace encoding data 326 may include the tone and pace scores and/or tone and pace intensity scores produced using one or more of lexicons 320, heuristics 322, and models 324. For example, tone and pace encoding data 326 may include a text sequence of document text 312, syntactic structure for the text sequence, and the associated tone and pace annotations or tone and pace scores produced by each of lexicons 320, heuristics 322, and models 324. In particular embodiments, tone and pace encoder instructions 318 may use a machine-learning model 324 to compute a first score and uses a set of digital lexicons to compute at least one second score and uses a set of digital heuristics to compute at least one third score. A combination of the first score, second score, and third score may be transmitted as tone and pace encoding data 326.

In particular embodiments, tone and pace encoding data 326 may further include weight values assigned by tone and pace encoder instructions 318 to the tone and pace scores produced by lexicons 320, heuristics 322, and models 324. For example, output of model 324 may be used to increase or decrease weight values associated with output of lexicons 320 and/or heuristics 322, where the weight values serve as numerical indicators of the relative significance of a particular tone or pace score with respect to a particular text sequence. As such, tone and pace predictions produced by model 324, which makes tone and pace predictions based on historical instances of training data, may override tone and pace scores produced by one or more of the rule-based approaches. For example, a model 324 may discard a tone prediction produced by a lexicon 320 or heuristics 322 based on an analysis of the input text sequence. In this way, tone and pace encoder instructions 318 may be programmed to account for the possibility that a text sequence may have multiple different semantic interpretations and use a model 324 to select the most probable semantic interpretation and associated tone prediction, given the training data used to create the model 324. As used herein, terminology such as tone score, tone annotation or tone label may be used herein to refer to digital data that indicates a particular tone, a particular tone intensity, or a particular tone polarity or sentiment, or a combination of any of the foregoing. Thus, for example, a tone score may indicate the presence or absence of a tone and its polarity and intensity. Similarly, terminology such as pace score or pace label may be used herein to refer to digital data that provides an indication of a particular pace, etc.

In particular embodiments, tone and pace encoder instructions 318 may repeat tone and pace scoring operations on syntactic structure data 316 corresponding to other portions of document text 312. In an embodiment, tone, and pace encoding data 326 may be output for display to a user via a graphical user interface and/or provided as input to a document-level tone and pace detection process such as in flow diagram 350 of FIG. 3C, described below.

FIG. 3C illustrates example flow diagram 350 of a computer-implemented process of performing tone and pace detection on input audio. The operations of flow diagram 350 as shown in FIG. 3C may be implemented using processor-executable instructions stored in computer memory. Although this disclosure describes the operations of FIG. 3C as being performed by computing system 100, this disclosure contemplates any suitable system, device, or implemented techniques.

In particular embodiments, flow diagram 350 involves the execution by at least one processor of computer code including summarizer instructions 328, tone and pace predictor instructions 334, anti-bias instructions 332, secure storage instructions 336, tone and pace selection interface instructions 340, and audio model training instructions 346. Instructions 328, 334, 332, 226, 340, and 346 may operate on digital data including portions of tone and pace encoding data 326. For example, instructions 328, 334, 332, 226, 340, and 346 may be written using any suitable computer programming language and/or software development framework. Digital data, including portion of tone and pace encoding data 326, conversation level tone and pace encoding data 330, anti-bias selection data 333, candidate tone and pace data 338, tone and pace selection data 342, and securely stored encoding data 344 may be stored in computer memory as needed, for example, in a searchable database and/or a structured data file such as XML (extensible Markup Language) file. In an embodiment, portions of tone and pace encoding data 326, conversation level tone and pace encoding data 330, anti-bias selection data 333, candidate tone and pace data 338, tone and pace selection data 342, and securely stored encoding data 344 may be stored in a reference data store.

In particular embodiments, summarizer instructions 328 may be programmed to input tone and pace encoding data 326, as generated by tone and pace encoder instructions 318 for one or more text sequences of document text 312. For example, summarizer instructions 328 may synthesize tone and pace encoding data 326 of one or more particular text sequences and to generate conversation-level tone and pace encoding data 330. For example, summarizer instructions 328 may be programmed to concatenate the tone and pace encoding data 326 for a particular conversation to create conversation-level tone and pace encoding data 330. For example, summarizer instructions 328 may compute a sum of pace and tone scores for each pace and tone indicated in the tone and pace encoding data 326 for document text 312.

In particular embodiments, tone and pace encoding data 326 may be transmitted to the tone and pace predictor instructions 334, anti-bias instructions 332, and/or secure storage instructions 336. For example, tone and pace predictor instructions 334 may be programmed to select a set of tone and/or pace scores and corresponding labels based on the conversation level tone and pace encoding data 330. For example, tone and pace predictor instructions 334 may select the top k tone and/or pace scores, where k is a threshold integer or percentage value, and may include tone and pace labels corresponding to top k tone and/or pace scores in candidate tone and pace data 338.

Conversation between participants to a virtual conference will have different tones and paces over the course of the conversation, as reflected in document text 312. For example, at the sentence level, each sentence may have different tone and pace annotations made throughout the text sequence. Conversation level tone and pace encoding data 330 may sum a plurality of sentence level tone and pace encoding data 326 and based on repeated tones/paces the tone and pace detection system 210 may generate one or more predictions on the overall tone and/or pace. In particular embodiments, anti-bias instructions 332 may be programmed to periodically modify the set of tone and pace scores that have been selected by the tone and pace predictor instructions 334. For example, if a particular pace, tone, and/or corresponding expression consistently dominates the tone and pace predictions, anti-bias instructions 332 may supply anti-bias selection data 333, which may be used to incorporate one or more non-dominant tones and/or pace within candidate tone and pace data 338.

For example, the anti-bias selection data 333 may be randomly selected tone and/or pace scores that fall below a threshold tone and/or pace value or probability value. For example, to avoid biasing the model based on the repeated selection of the most common tone, a low-scoring tone may be randomly selected and included in the set of candidate tones. This implements "exploration versus exploitation" and has been found to improve the accuracy of tone recommendations by allowing users to select a tone that is correct but atypical. User feedback selecting a low-scoring tone is considered more accurate than repeated selection of high-scoring tones. For example, anti-bias instructions 332 may be implemented using a second machine-learning model, such as a contextual multi-armed bandit model. Anti-bias instructions 332 may be implemented as a multi-armed bandit model using an open-source machine-learning framework such as vowpal wabbit. Although this disclosure describes a multi-armed bandit machine-learning model, this disclosure contemplates any suitable machine-learning model.

In particular embodiments, the tone and pace encoding data 326, summarizer instructions 328, and conversation level tone and pace encoding data 330 may be stored for a period of time. To protect the encoding data from unauthorized access, secure storage instructions 336 may be programmed to create a secure version of portions of the tone and pace encoding data 326 and the conversation level tone and pace encoding data 330. For example, secure storage instructions 336 may be programmed to generate a one-way hash value of each discrete portion of one or more text sequences using a cryptographic hash function. For example, secure storage instruction 336 may be programmed to hash each word, token, n-gram, or phrase separately. In this way, secure storage instructions 336 enable the system to avoid unauthorized disclosure of the text sequence in the case of a security breach.

Figure 7:
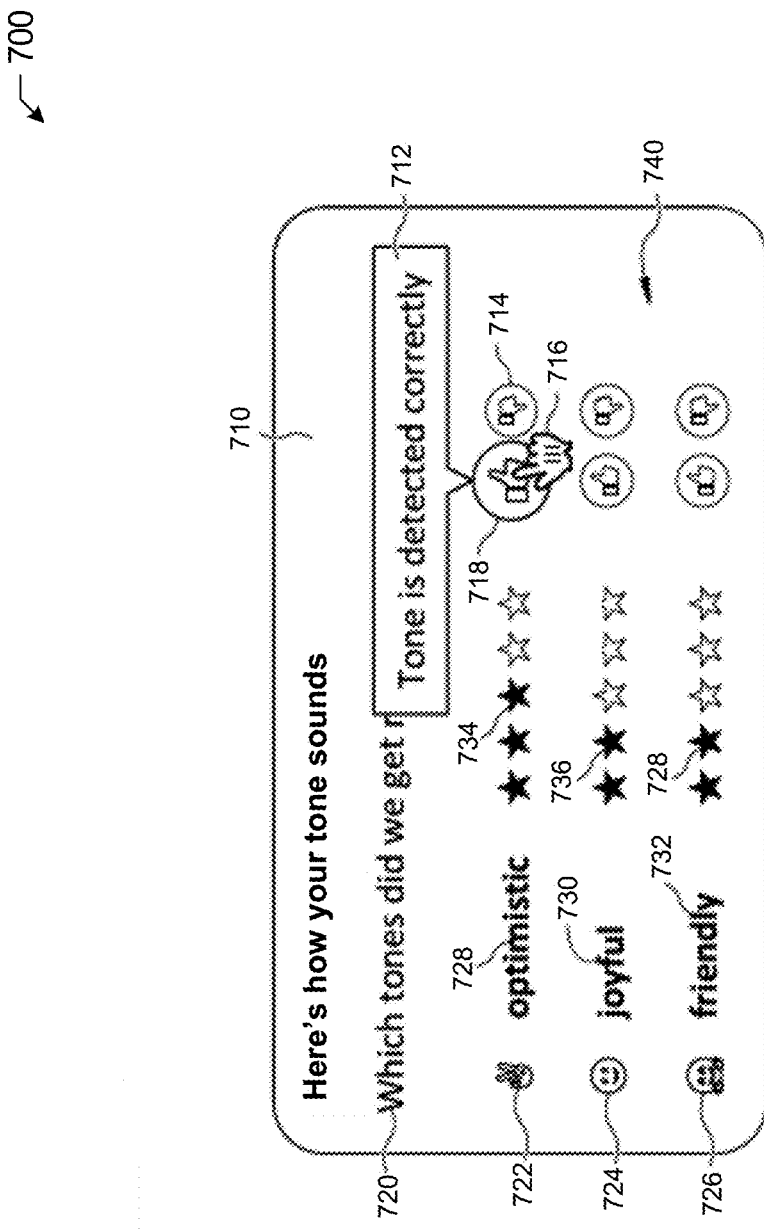
FIG. 7 illustrates an example screen capture of a display on a computer display device that may be implemented in at least one embodiment of the computer system of FIG. 1.

In particular embodiments, candidate tone and pace data 338 may be transmitted to tone and pace selection interface instructions 340 for processing candidate tone and pace data 338. The tone and pace selection interface instructions 340 may be programmed to convert candidate tone and pace data 338 into a display of tone and/or pace labels. For example, tone and pace selection interface instructions 340 may be programmed to display, via a graphical user interface, one or more sets of tone and/or pace labels corresponding to the candidate tone and pace data 338. As another example, the tone and pace selection interface instructions 340 may cause displaying, via a graphical user interface, at least one graphical control element that is selectable by a user to provide a rating or vote for one or more of the tone labels. Examples of tone labels produced by a graphical user interface are shown in FIG. 7 and further described below.

In particular embodiments, in response to the display of one or more tone and/or pace labels along with one or more graphical control elements for user rating and/or voting, the tone and pace selection interface instructions 340 may be programmed to output tone and pace selection data 342. Combined, the securely stored encoding data 344 and the tone and pace selection data 342 may be input to the audio model training instructions 346. In particular embodiments, Audio model training instructions 346 may be programmed to combine tone and pace selection data 342 with the corresponding securely stored encoding data 344 to produce instances of training data, and may feel the instances of training data as input to one or more models, such as model 324. For example, to produce instances of training data, tone and pace selection data 342 may be mapped to the corresponding portions of securely stored encoding data 344 by evaluating hash values for individual portions of the input text sequence. In particular embodiments, tone and pace selection data 342 may be linked with one or more particular locations of the input text sequence that gave rise to the tone and pace prediction on which user feedback was received. For example, if tone and pace detection system 210 predicts the tone and pace of the first user is "friendly," but the user inputs feedback of a "thumbs down," the audio model training instructions 346 may be updated. In this way, the one or more machine-learning models 324 may be updated, modified, and adapted over time in response to user feedback.

2.5 Example Video Processing System

Figure 4:
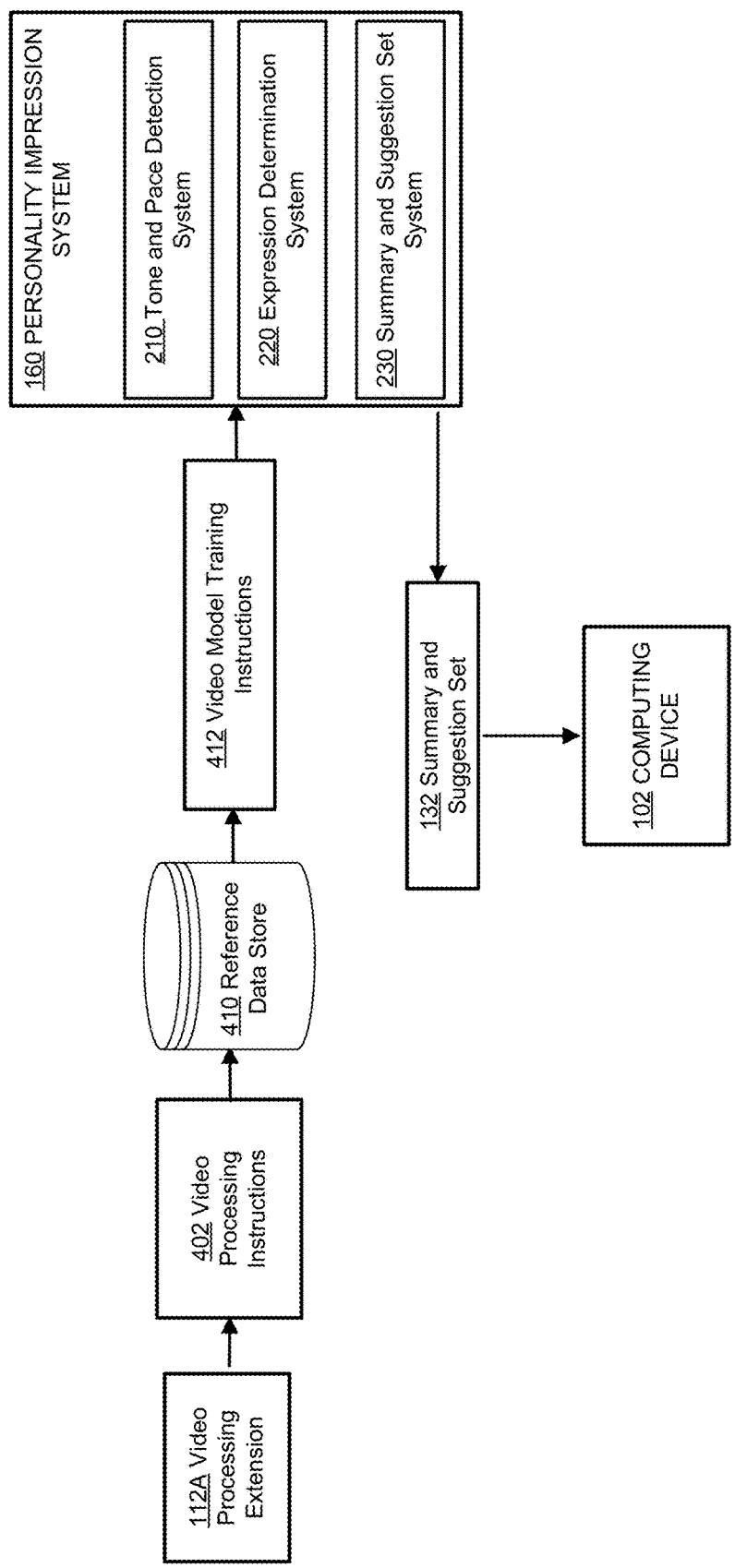
FIG. 4 illustrates an example computer system showing the context of use and principal functional elements of processing video input and producing an output summary and suggestion set.

FIG. 4 illustrates an example computer system 400 showing the context of use and principal functional elements of processing video input and producing an output summary and suggestion set. In particular embodiments, as demonstrated by computer system 400 of FIG. 4, the video processing extension 112A, 112B may be programmed to transmit electronic video data to video processing instructions 402. Video processing instructions 402 may be programmed to perform conversion of the video data into a plurality of still images. For example, video processing instructions 402 may perform a gamma correction process, noise filtering, subtraction of particular colors, compression, reconstruction, and/or any suitable image processing technique.

In particular embodiments, the processed still images output by video processing instructions 402 may be input to one or more reference data stores 410. Reference data store 410 is, in an embodiment, at least one digital data store that may be used to train, test, and/or tune the personality impression system 160. In an embodiment, reference data store 410 may store training data that is periodically collected by the personality impression system 160. In an embodiment, upon storing training data in reference data store 410, video model training instructions 412 may be programmed to operate on digital data including the still images of the video data. Video Model training instructions 412 may be written using any suitable computer programming language, such as Python, JAVASCRIPT, C, C++, and/or software development framework. For example, digital data, including the still images, may be stored in a searchable database (for example, reference data store 410) and/or a structured data file such as an XML (eXtensible Markup Language) file. Video model training instructions 412 may transmit a set of instructions for video processing by the tone and pace detection system 210, expression determination system 220, and summary and suggestion set system 230. For example, video model training instructions 412 may include instructions to extract a set of features from the still images to determine a count of participants in the virtual conference and store images corresponding to each still image in a respective user profile.

As another example, video model training instructions 412 may instruct the personality impression system 160 to classify one or more sets of still images on a sentence level. For example, if the first user is speaking from a timestamp of 2 minutes and 30 seconds within the virtual conference, until 4 minutes and 15 seconds, video model training instructions 412 may instruct personality impression system 160 to segment all still images of the first user taken between 2 minutes 30 seconds and 4 minutes 15 seconds as one set of images, and segment still images of the participant the first user was speaking to as a second set of still images. The expression determination system 220 may be programmed to process both sets of images. In this way, the personality impression system may classify a personality impression for the first user (for example, confident, speaking at a fast pace, smiling), as well as classify a personality impression for a second participant (for example, confused, furrowed eyebrows) to determine a summary and suggestion set 132 for transmittal to the first user for display on a graphical user interface of computing device 102. In this example, the summary and suggestion set 132 may prompt the first user to adjust their behavior in response to the participant's expressions during the virtual conference with the goal of increasing participant engagement. An example of a suggestion may be "slow down your speech, the participants may be confused."

2.6 Example Summary and Suggestion Set Displays

Figure 5:
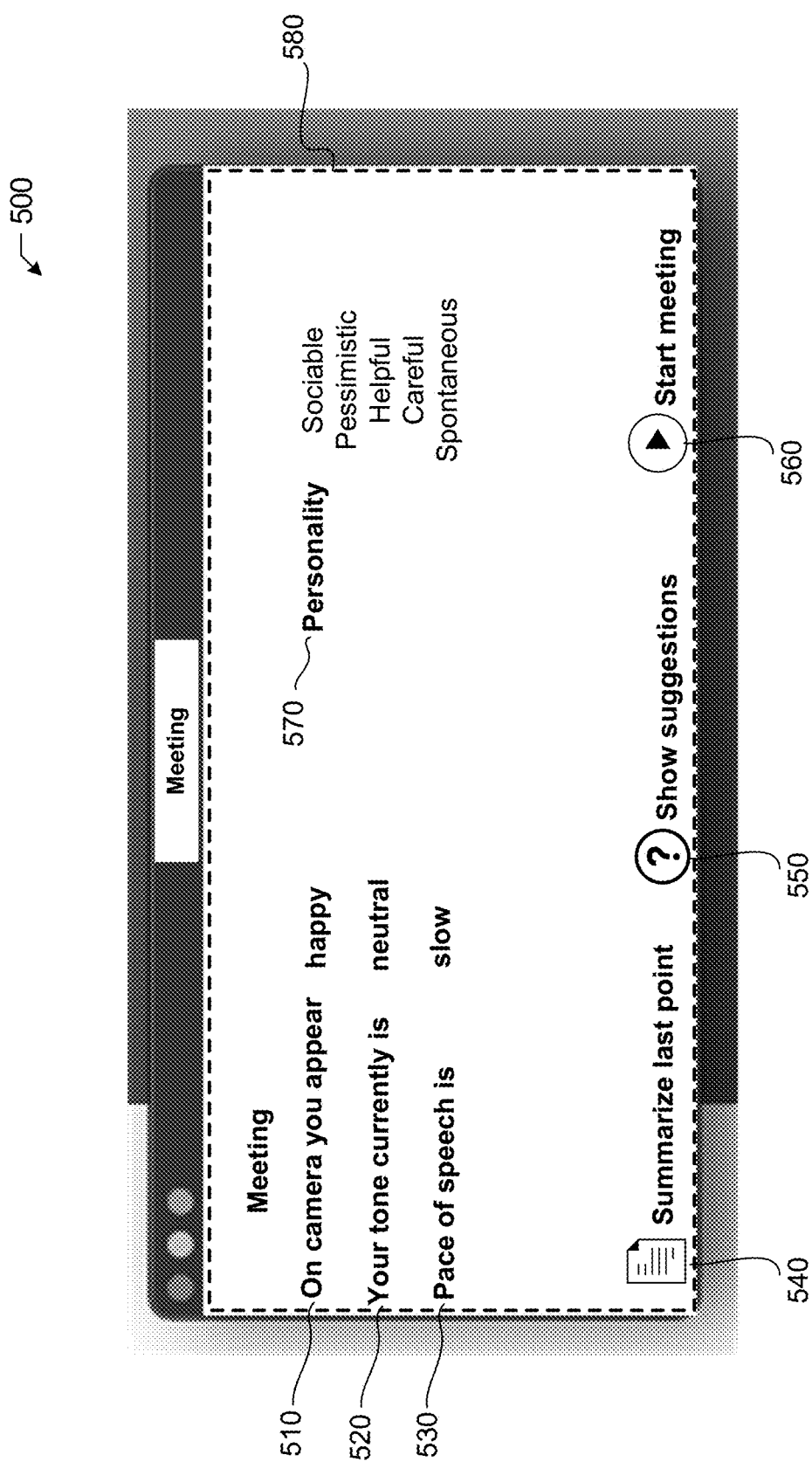
FIG. 5 illustrates an example of a graphical user interface that may be programmed to display a meeting summary in conjunction with an application.

FIG. 5 illustrates an example of a graphical user interface 500 that may be programmed to display a meeting summary in conjunction with an application. As demonstrated in FIG. 5, meeting summary window 580, as displayed via a graphical user interface of computing device 102, may be programmed to present a plurality of functions to the user. For example, meeting summary window 580 may provide suggestions and summaries in real-time. As another example, meeting summary window 580 may be displayed to the user upon completion of the virtual conference. Meeting summary window 580 may display summaries 510, 520, 530, and 570 as output by the personality impression system 160. For example, summaries 510, 520, 530, and 570, as displayed in FIG. 5, may state, "On camera you appear: happy,"

"Your tone currently is: neutral," "Your pace of speech is: slow," and "Personality: Sociable, Pessimistic, Helpful, Careful, Spontaneous." Although this disclosure displays a particular set of summaries, this disclosure contemplates any suitable summary and/or display of summaries.

In particular embodiments, meeting summary window 580 may be programmed to display one or more selectable icons for user interaction. User interaction with the one or more selectable icons may be detected by a touchpad, mouse, a trackball, or cursor direction key for communicating direction information and command selections for controlling cursor movement on the display of computing device 102. Computing device 102 may have at least two degrees of freedom in two axes, a first axis (for example, x) and a second axis (for example, y) that allows the device to specify positions in a plane. As another example, input devices may be wired, wireless, or optical control devices such as a joystick, wand, console, or other suitable input device. For example, when selected, icon 540 "Summarize last point," may prompt the personality impression system 160 to generate a summary of the last point of the first user's speech within the virtual conference. As another example, icon 550 "Show suggestions," when selected by the user may prompt the personality impression system 160 to transmit suggestion set 132 to computing device 102 for display via a graphical user interface. For example, a suggestion may be "speak more slowly." In an embodiment, when selected, icon 560 "Start meeting" may transmit one or more set of instructions to prompt browser 108 and/or application 106 to begin the virtual conference, and a plurality of participants may join the virtual conference.

In particular embodiments, the audio-to-text document processor at step 302 may be programmed to generate document text 312 corresponding to the entirety of the virtual conference (for example, a transcript). For example, icon 550 "Show suggestions," when selected by the user may generate a transcript and corresponding timeline of the virtual conference. In this example, the user may interact with a sliding bar on the timeline to search through segments of conversation recorded over the duration of the virtual conference. In response to user selection of one or more sentences of the transcript, phrase check 144A, 144B, 144C may evaluate the selected text using a trained multi-class text classifier machine learning model. For example, phrase check 144A, 144B, 144C may be coupled to or can access phrase store 170, which may be integrated with content processor 140 or implemented as separate storage. In some embodiments, phrase store 170 may comprise a database, flat file system, object store, or other digital data repository that stores a large number of textual phrase suggestions in association with category values or tags that specify a category or type of communication in which the suggestion may be substituted. For example, phrase check 144 and/or content processor 140 may be programmed for evaluating each particular text unit among a plurality of text units using a trained multi-class text classifier that classifies each particular source text unit as a particular class of phrase among a plurality of possible classes of phrases. Feedback suggestion instructions 148 may be programmed to, in part, output the summary and suggestion set 132 to transmit text to text processing extension 110A, 110B.

In particular embodiments, content processor 140 may be programmed to detect that a suggestion should be given and select one or more suggestions to provide. In one approach, phrase check 144 may be programmed to form vectors in a labeled dataset digitally stored in phrase store 170. In this manner, the content processor 140 may be programmed for dividing the source text into one or more source text units (for example, a sentence). The dividing may occur via a parser or other programmed algorithm capable of inspecting natural language text, identifying tokens or units of the text, identifying syntactic units, and so forth. Other units may be used in other embodiments including clauses, multi-sentence groups, paragraphs, and so forth.

In one implementation, text classifier 146 may be programmed to support a plurality of different outputs which respectively correspond to tones and personality impressions, such as friendly, optimistic, etc. In an embodiment, upon selection of a particular sentence or a segment of the conversation, the summary and suggestion set system 230 may modify the text of the document text 312 to generate a suggested phrase as a way of suggestion. Examples of modification recommendations may include but are not limited to deleting text, adding text, modifying text, reordering the text, adding a digital markup, and adding a graphical control element indicative of a tone and/or personality impression. For example, in the case that during the virtual conference the first user is recorded as saying "That doesn't make any sense," the personality impression system 160 may store the sentence as a first text sequence and correspond with phrase store 170 to determine a modification to the text that may achieve a goal of producing a friendlier output (for example, second text sequence). For example, the modification may be generated as "thank you for that explanation, would you mind further explaining your point?" In this example, phrase store 170 may transmit the modification as a part of the summary and suggestion set 132. The graphical user interface may display a modified text sequence, the modified text sequence including a markup of the first text sequence, a graphical control element indicative of a tone associated with the first text sequence (for example, angry, frustrated), and a graphical control element indicative of a tone associated with the second text sequence (for example, friendly).

Figure 6:
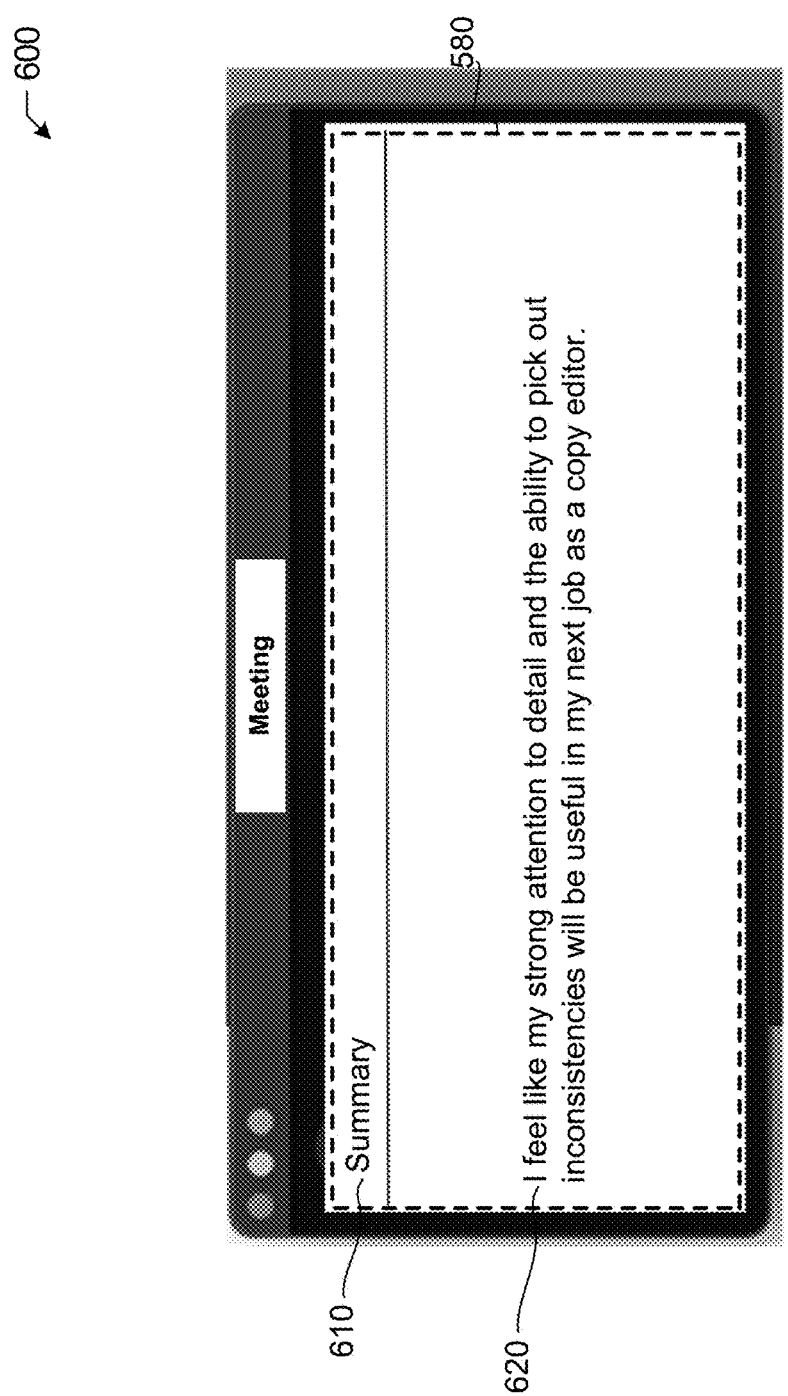
FIG. 6 illustrates an example of a graphical user interface that may be programmed to display a meeting summary in conjunction with an application.

FIG. 6 illustrates an example of a graphical user interface 600 that may be programmed to display a meeting summary in conjunction with an application. As demonstrated in FIG. 6, summary window 580, as displayed via a graphical user interface of computing device 102, may present the user with a title 610 (for example, summary) and editable text box widget 620. In this example, the user may provide input from a keyboard, pointing device, and/or touchscreen of computing device 102, in which the text input may be stored in one or more of reference data store 410 and/or the machine-learning training model 240 for further training of model(s) 324.

FIG. 7 illustrates an example screen capture 700 of a display on a computer display device that may be implemented in at least one embodiment of the computer system of FIG. 1. In particular embodiments, tone and pace detection system 210 in combination with expression determination system 220 may transmit output to the summary and suggestion set system 230. The summary and suggestion set system 230 may generate a summary display including tone, pace, expression, and personality impressions from either a portion of the input text, or alternatively, from the entirety of the conversation. In particular embodiments, personality impression system 160 may transmit the summary to feedback suggestion instructions 148 for further processing. Once processed, the summary set may be transmitted as a summary and suggestion set 132 to computing device 102 for display by a first user. In particular embodiments, the summary set may be ranked based on one or more ranking criterion prior to transmission to computing device 102 for display, as instructed by ranking instructions 150. The ranking instructions 150 may be programmed to rank the initial set of suggestions according to any useful ranking criterion such as similarly to a source text unit, dissimilarity, popularity across a community of users, or other criteria.

In particular embodiments, a summary window 710 may be displayed on a graphical user interface of computing device 102. In particular embodiments, summary window may comprise feedback area 740, and user feedback may be submitted through a plurality of functionalities, such as buttons 718, 714. For example, summary window 710 may present prompt 720, prompting the first user to submit user feedback. For example, prompt 720 may include "which tones did we get right?" or "which personality impression did we get right?"

In particular embodiments, feedback area 740 may include ratings 734, 736, and 728, indicative of the prediction generated by the personality impression system 160. For example, rating 734, corresponding to three stars may indicate that the personality impression system 160 has determined that it is more statistically likely that the first user demonstrated qualities of being "optimistic" over the duration of the virtual conference. As another example, rating 728, corresponding to the rating for the trait of "friendly," displays a rating of two stars, thereby indicating that it is less statistically likely that the first user demonstrated qualities of being "friendly" over the duration of the virtual conference. In particular embodiments, summary window 710 may display a voting functionality with thumbs up button 718 and thumbs down button 714. In particular embodiments, the first user, via an input functionality 588 may select thumbs up button 718, where in response to the user feedback, text label 712 may be generated indicating the type of vote that will be recorded by the selection of thumbs up button 718. As demonstrated in FIG. 7, text label 712 may generate text such as "tone is detected correctly" in response to user feedback of the thumbs up button 718. In particular embodiments, summary window 710 may include, for each personality impression 728, 730, 732, personality indicators 722, 724, 726. For example, for a "joyful" personality impression, the personality indicator 724 may represent a smiling emoticon.

2.7 Example Personality Impression System

Figure 8:
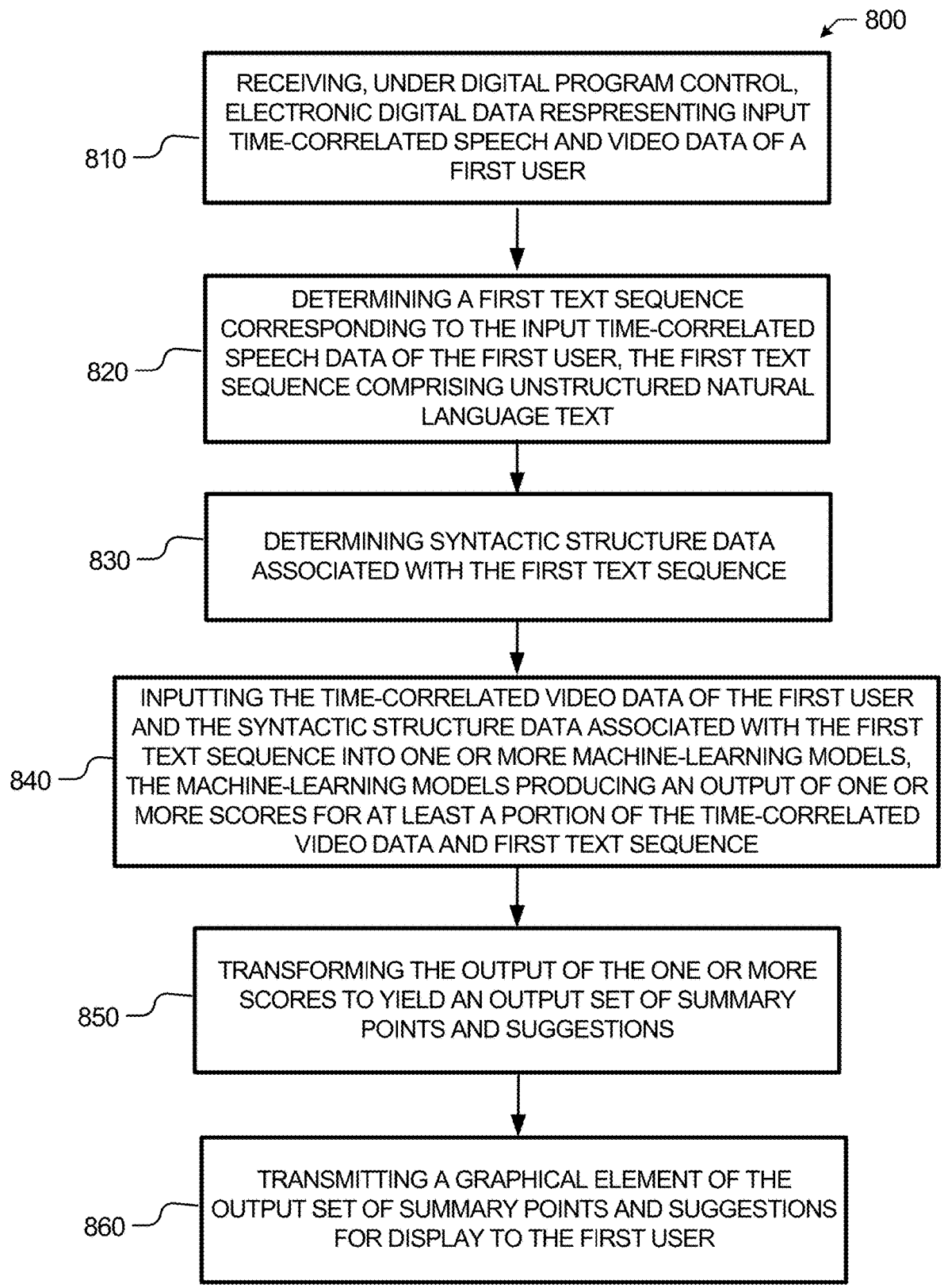
FIG. 8 illustrates a flow diagram of a process that may be executed by at least one device of the computer system of FIG. 1.

FIG. 8 illustrates a flow diagram 800 of a process that may be executed by at least one device of the computer system of FIG. 1.

At step 810 of FIG. 8, in an embodiment, using a computer system, under digital program control, the process may receive electronic digital data representing input time-correlated speech data and video data of a first user. For example, as described for FIG. 1, video processing extension 112A, 112B and audio processing extension 114A, 114B may be programmed to receive video and speech data of a first user participating in a virtual conference.

At step 820, the computer system may be programmed to determine a first text sequence corresponding to the input time-correlated speech data of the first user. For example, the first text sequence may comprise unstructured natural language text. In an embodiment, speech data may be transmitted to content processor 140, and the audio of audio processing extension 114A, 114B may be processed by the audio-to-text document processor 302 and converted to document text 312, as described in relation to FIG. 3A, FIG. 3B, FIG. 3C.

In particular embodiments, at step 830, the process may be programmed to determine syntactic structure data associated with the first text sequence. For example, syntactic parser instructions 314 may be programmed to retrieve and process document text 312. In particular embodiments, during the processing of document text 312, syntactic parser instructions 314 may extract a set of features from the first portion of the text sequence. Examples of the text sequence may include raw features such as n-grams, tokens, words, word pairs, phrases, and chunks of the text sequence. Syntactic parser instructions 314 analyzes the raw features using, for example, a statistical model, and produces computed features, such as part-of-speech tags and dependency relation data, associated with the raw features. For example, computed features may include dependency relation data associated with particular word pairs or phrases of the first portion of the text sequence. Computed features may also include part of speech data such as annotations that identify the part of speech of a particular word of the text sequence. Computed features may be associated with raw features by, for example, annotating portions of the raw features with the corresponding computed features. As used herein, raw features and computed features may be referred to collectively as features.

In particular embodiments, syntactic parser instructions 314 may produce and output sentence-level syntactic structure data and/or conversation-level syntactic structure data. At the sentence level, syntactic parser instructions 314 may repeat parsing operations for portions of document text 312 until syntactic parser instructions 314 detect an end of document and/or conversation. Examples of end of document and/or conversation signals include but are not limited to periods and other punctuation marks, blank spaces, tab signals, and new paragraph signals that are not followed by additional text.

In particular embodiments, at step 840, the computer system may input the time-correlated video data of the first user and the syntactic structure data 316 associated with the first text sequence into one or more machine-learning models. The machine-learning models may produce an output of one or more scores for at least a portion of the time-correlated video data and first text sequence.

At step 850, the computer system may transform the output of the one or more scores to yield an output set of summary points and suggestions.

The process may conclude at step 860, at which the computer system may transmit a graphical element of the output set of summary points and suggestions for display to the first user via a graphical user interface.

3. Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques or may include digital electronic devices such as at least one application-specific integrated circuit (ASIC) or field-programmable gate array (FPGA) that is persistently programmed to perform the techniques or may include at least one general-purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body-mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 9:
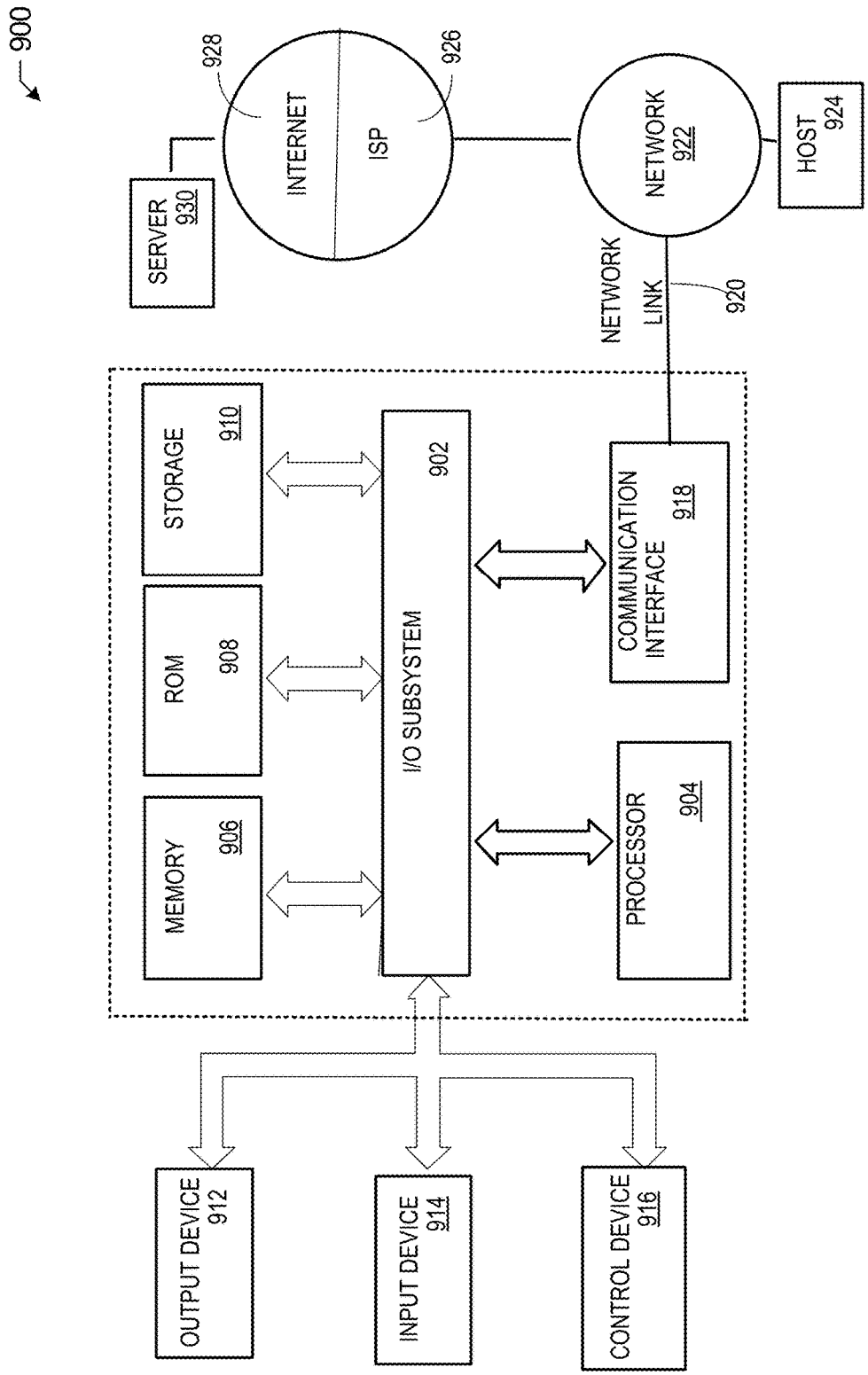
FIG. 9 illustrates a computer system with which one embodiment could be implemented.

FIG. 9 is a block diagram that illustrates an example computer system with which an embodiment may be implemented. In the example of FIG. 9, a computer system 900 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 900 includes an input/output (I/O) subsystem 902 which may include a bus and/or other communication mechanisms for communicating information and/or instructions between the components of the computer system 900 over electronic signal paths. The I/O subsystem 902 may include an I/O controller, a memory controller, and at least one I/O port. The electronic signal paths are represented schematically in the drawings, for example as lines, unidirectional arrows, or bidirectional arrows.

At least one hardware processor 904 is coupled to I/O subsystem 902 for processing information and instructions. Hardware processor 904 may include, for example, a general-purpose microprocessor or microcontroller and/or a special-purpose microprocessor such as an embedded system or a graphics processing unit (GPU) or a digital signal processor or ARM processor. Processor 904 may comprise an integrated arithmetic logic unit (ALU) or may be coupled to a separate ALU.

Computer system 900 includes one or more units of memory 906, such as a main memory, which is coupled to I/O subsystem 902 for electronically digitally storing data and instructions to be executed by processor 904. Memory 906 may include volatile memory such as various forms of random-access memory (RAM) or another dynamic storage device. Memory 906 also may be used for storing temporary variables or other intermediate information during the execution of instructions to be executed by processor 904. Such instructions, when stored in non-transitory computer-readable storage media accessible to processor 904, can render computer system 900 into a special-purpose machine that is customized to perform the operations specified in the instructions.

Computer system 900 further includes non-volatile memory such as read-only memory (ROM) 908 or other static storage devices coupled to I/O subsystem 902 for storing information and instructions for processor 904. The ROM 908 may include various forms of programmable ROM (PROM) such as erasable PROM (EPROM) or electrically erasable PROM (EEPROM). A unit of persistent storage 910 may include various forms of non-volatile RAM (NVRAM), such as FLASH memory, or solid-state storage, magnetic disk or optical disks such as CD-ROM or DVD-ROM and may be coupled to I/O subsystem 902 for storing information and instructions. Storage 910 is an example of a non-transitory computer-readable medium that may be used to store instructions and data which when executed by the processor 904 cause performing computer-implemented methods to execute the techniques herein.

The instructions in memory 906, ROM 908 or storage 910 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming, or other functions; data protocol instructions or stacks to implement TCP/IP, HTTP, or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server, or web client. The instructions may be organized as a presentation layer, application layer, and data storage layer such as a relational database system using a structured query language (SQL) or no SQL, an object store, a graph database, a flat-file system, or other data storage.

Computer system 900 may be coupled via I/O subsystem 902 to at least one output device 912. In one embodiment, output device 912 is a digital computer display. Examples of a display that may be used in various embodiments include a touchscreen display or a light-emitting diode (LED) display or a liquid crystal display (LCD) or an e-paper display. Computer system 400 may include another type (s) of output devices 912, alternatively or in addition to a display device. Examples of other output devices 912 include printers, ticket printers, plotters, projectors, sound cards or video cards, speakers, buzzers or piezoelectric devices or other audible devices, lamps or LED or LCD indicators, haptic devices, actuators, or servos.

At least one input device 914 is coupled to I/O subsystem 902 for communicating signals, data, command selections, or gestures to processor 904. Examples of input devices 914 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 916, which may perform cursor control or other automated control functions such as navigation in a graphical interface on a display screen, alternatively or in addition to input functions. Control device 916 may be a touchpad, a mouse, a trackball, or cursor direction keys for communicating direction information and command selections to processor 904 and for controlling cursor movement on an output device 912 such as a display. The input device may have at least two degrees of freedom in two axes, a first axis (for example, x) and a second axis (for example, y), that allows the device to specify positions in a plane. Another type of input device is a wired, wireless, or optical control device such as a joystick, wand, console, steering wheel, pedal, gearshift mechanism, or another type of control device. An input device 914 may include a combination of multiple different input devices, such as a video camera and a depth sensor.

In another embodiment, computer system 900 may comprise an internet of things (IOT) device in which one or more of the output device 912, input device 914, and control device 916 are omitted. Or, in such an embodiment, the input device 914 may comprise one or more cameras, motion detectors, thermometers, microphones, seismic detectors, other sensors or detectors, measurement devices or encoders and the output device 912 may comprise a special-purpose display such as a single-line LED or LCD display, one or more indicators, a display panel, a meter, a valve, a solenoid, an actuator or a servo.

When computer system 900 is a mobile computing device, input device 914 may comprise a global positioning system (GPS) receiver coupled to a GPS module that is capable of triangulating to a plurality of GPS satellites, determining and generating geo-location or position data such as latitude-longitude values for a geophysical location of the computer system 900. Output device 912 may include hardware, software, firmware, and interfaces for generating position reporting packets, notifications, pulse or heartbeat signals, or other recurring data transmissions that specify a position of the computer system 900, alone or in combination with other application-specific data, directed toward host computer 924 or server computer 930.

Computer system 900 may implement the techniques described herein using customized hard-wired logic, at least one ASIC or FPGA, firmware, and/or program instructions or logic which when loaded and used or executed in combination with the computer system causes or programs the computer system to operate as a special-purpose machine. According to one embodiment, the techniques herein are performed by computer system 900 in response to processor 904 executing at least one sequence of at least one instruction contained in main memory 906. Such instructions may be read into main memory 906 from another storage medium, such as storage 910. Execution of the sequences of instructions contained in main memory 906 causes processor 904 to perform the process steps described herein. In alternative embodiments, hard-wired circuitry may be used in place of or in combination with software instructions.

The term "storage media," as used herein, refers to any non-transitory media that store data and/or instructions that cause a machine to operate in a specific fashion. Such storage media may comprise non-volatile media and/or volatile media. Non-volatile media includes, for example, optical or magnetic disks, such as storage 910. Volatile media includes dynamic memory, such as memory 906. Common forms of storage media include, for example, a hard disk, solid-state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 902. Transmission media can also take the form of acoustic or light waves, such as those generated during radio-wave and infrared data communications.

Various forms of media may be involved in carrying at least one sequence of at least one instruction to processor 904 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 900 can receive the data on the communication link and convert the data to a format that can be read by computer system 900. For instance, a receiver such as a radio frequency antenna or an infrared detector can receive the data carried in a wireless or optical signal and appropriate circuitry can provide the data to I/O subsystem 902 and place the data on a bus. I/O subsystem 902 carries the data to memory 906, from which processor 904 retrieves and executes the instructions. The instructions received by memory 906 may optionally be stored on storage 910 either before or after execution by processor 904.

Computer system 900 also includes a communication interface 918 coupled to a bus of the I/O interface 902. Communication interface 918 provides a two-way data communication coupling to a network link(s) 920 that are directly or indirectly connected to at least one communication network, such as a network 922 or a public or private cloud on the Internet. For example, communication interface 918 may be an Ethernet networking interface, integrated-services digital network (ISDN) card, cable modem, satellite modem, or a modem to provide a data communication connection to a corresponding type of communications line, for example, an Ethernet cable or a metal cable of any kind or a fiber-optic line or a telephone line. Network 922 broadly represents a local area network (LAN), wide-area network (WAN), campus network, internetwork, or any combination thereof. Communication interface 918 may comprise a LAN card to provide a data communication connection to a compatible LAN or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 918 sends and receives electrical, electromagnetic, or optical signals over signal paths that carry digital data streams representing various types of information.

Network link 920 typically provides electrical, electromagnetic, or optical data communication directly or through at least one network to other data devices, using, for example, satellite, cellular, Wi-Fi, or BLUETOOTH technology. For example, network link 920 may provide a connection through network 922 to a host computer 924.

Furthermore, network link 920 may provide a connection through network 922 or to other computing devices via internetworking devices and/or computers that are operated by an Internet Service Provider (ISP) 926. ISP 926 provides data communication services through a worldwide packet data communication network represented as internet 928. A server computer 930 may be coupled to internet 928. Server computer 930 broadly represents any computer, data center, virtual machine, or virtual computing instance with or without a hypervisor, or computer executing a containerized program system such as DOCKER or KUBERNETES. Server computer 930 may represent an electronic digital service that is implemented using more than one computer or instance and that is accessed and used by transmitting web services requests, uniform resource locator (URL) strings with parameters in HTTP payloads, API calls, app services calls, or other service calls. Computer system 900 and server computer 930 may form elements of a distributed computing system that includes other computers, a processing cluster, server farm, or other organization of computers that cooperate to perform tasks or execute applications or services. Server computer 930 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming, or other functions; data protocol instructions or stacks to implement TCP/IP, HTTP, or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server computer 930 may comprise a web application server that hosts a presentation layer, application layer, and data storage layer such as a relational database system using a structured query language (SQL) or no SQL, an object store, a graph database, a flat-file system or other data storage.

Computer system 900 can send messages and receive data and instructions, including program code, through the network(s), network link 920 and communication interface 918. In the Internet example, a server computer 930 might transmit a requested code for an application program through Internet 928, ISP 926, local network 922 and communication interface 918. The received code may be executed by processor 904 as it is received, and/or stored in storage 910, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 904. While each processor 904 or core of the processor executes a single task at a time, computer system 900 may be programmed to implement multitasking to allow each processor to switch between tasks that are being executed without having to wait for each task to finish. In an embodiment, switches may be performed when tasks perform input/output operations when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

What is claimed is:

1. A computer-implemented method comprising:
using a computer system and under stored program control, receiving electronic digital data representing input time-correlated speech data and video data;
by the computer system, determining a first text sequence corresponding to the input time-correlated speech data;
by the computer system, determining a syntactic structure data associated with the first text sequence;
by the computer system, inputting the time-correlated video data and the syntactic structure data associated with the first text sequence into one or more machine-learning models, the machine-learning models having been trained to produce, and producing, an output set of summary points and suggestions; and
by the computer system, transmitting a graphical element of the output set of summary points and suggestions to a computing device, such that rendering the graphical element using presentation functions of the computing device causes displaying the graphical element at the computing device.

2. The computer-implemented method of claim 1, further comprising:
by the computer system, presenting a plurality of functions of the output set of summary points and suggestions via a graphical user interface and receiving input via the graphical user interface specifying a plurality of selections of the plurality of functions;
by the computer system, updating the one or more machine-learning models using the plurality of selections, the first text sequence, and the syntactic structure data associated with the first text sequence;
by the computer system, applying the one or more machine-learning models to update the output set of summary points and suggestions; and
by the computer system, transmitting a graphical element of the updated output set of summary points and suggestions to a computing device, wherein rendering the graphical element using presentation functions of the computing device causes displaying the graphical element at the computing device.

3. The computer-implemented method of claim 1, further comprising:
by the computer system, inputting the time-correlated video data and the syntactic structure data into one or more machine-learning models, the machine-learning models having been trained to determine a first expression and a second expression; and
by the computer system, transmitting a graphical element of the first and second expressions to a computing device, wherein rendering the graphical element using presentation functions of the computing device causes displaying the graphical element at the computing device.

4. The computer-implemented method of claim 1, the machine-learning models comprising any one or more of expression determination systems and personality impression systems.

5. The computer-implemented method of claim 4, the one or more expression determination systems comprising a video-driven expression system to receive the time-correlated video data, the time-correlated video data having a plurality of frames that depict facial expressions from a video from whom the input time-correlated speech data and video data was obtained.

6. The computer-implemented method of claim 4, the one or more personality impression systems comprising a video-driven impression system to receive the time-correlated video data and an audio driven impression system to receive the time-correlated audio data, the time-correlated video data having a plurality of frames that depict facial expressions from a video from whom the input time-correlated speech data and video data was obtained.

7. The computer-implemented method of claim 1, the output set of summary points and suggestions comprising one or more of a classification of tone, speech, personality, and expression.

8. The computer-implemented method of claim 1, further comprising using a digital lexicon to associate the syntactic structure data for the first text sequence with a tone label.

9. The computer-implemented method of claim 1, further comprising, before the transmitting, ranking the output set of summary points and suggestions based on a ranking criterion.

10. One or more non-transitory computer-readable media storing one or more sequences of instructions, execution of which causes a computer system to perform:
   determining a first text sequence corresponding to the input time-correlated speech data;
   determining a syntactic structure data associated with the first text sequence;
   inputting the time-correlated video data and the syntactic structure data associated with the first text sequence into one or more machine-learning models, the machine-learning models having been trained to produce, and producing, an output set of summary points and suggestions; and
   transmitting a graphical element of the output set of summary points and suggestions to a computing device, such that rendering the graphical element using presentation functions of the computing device causes displaying the graphical element at the computing device.

11. The one or more non-transitory computer-readable media of claim 10, execution of the instructions further causing the computer system to perform:
   presenting a plurality of functions of the output set of summary points and suggestions via a graphical user interface and receiving input via the graphical user interface specifying a plurality of selections of the plurality of functions;
   updating the one or more machine-learning models using the plurality of selections, the first text sequence, and the syntactic structure data associated with the first text sequence;
   applying the one or more machine-learning models to update the output set of summary points and suggestions; and
   transmitting a graphical element of the updated output set of summary points and suggestions to a computing device, wherein rendering the graphical element using presentation functions of the computing device causes displaying the graphical element at the computing device.

12. The one or more non-transitory computer-readable media of claim 10, execution of the instructions further causing the computer system to perform:
   inputting the time-correlated video data and the syntactic structure data into one or more machine-learning models, the machine-learning models having been trained to determine a first expression and a second expression; and
   transmitting a graphical element of the first and second expressions to a computing device, wherein rendering the graphical element using presentation functions of the computing device causes displaying the graphical element at the computing device.

13. The one or more non-transitory computer-readable media of claim 10, the machine-learning models comprising any one or more of expression determination systems and personality impression systems.

14. The one or more non-transitory computer-readable media of claim 13, the one or more expression determination systems comprising a video-driven expression system to receive the time-correlated video data, the time-correlated video data having a plurality of frames that depict facial expressions from a video from whom the input time-correlated speech data and video data was obtained.

15. The one or more non-transitory computer-readable media of claim 13, the one or more personality impression systems comprising a video-driven impression system to receive the time-correlated video data and an audio driven impression system to receive the time-correlated audio data, the time-correlated video data having a plurality of frames that depict facial expressions from a video from whom the input time-correlated speech data and video data was obtained.

16. The one or more non-transitory computer-readable media of claim 10, the output set of summary points and suggestions comprising one or more of a classification of tone, speech, personality, and expression.

17. The one or more non-transitory computer-readable media of claim 10, execution of the instructions further causing the computer system to perform:
   using a digital lexicon to associate the syntactic structure data for the first text sequence with a tone label.

18. The one or more non-transitory computer-readable media of claim 10, execution of the instructions further causing the computer system to perform:
   before the transmitting, ranking the output set of summary points and suggestions based on a ranking criterion.

19. A computer system comprising:
   at least one processor;
   at least one communication interface coupled to the at least one processor; and
   at least one non-transitory program storage device coupled to the at least one processor and storing instructions, execution of which by the at least one processor causes the computer system to perform operations comprising:
      determining a first text sequence corresponding to the input time-correlated speech data;
      determining a syntactic structure data associated with the first text sequence;
      inputting the time-correlated video data and the syntactic structure data associated with the first text sequence into one or more machine-learning models, the machine-learning models having been trained to produce, and producing, an output set of summary points and suggestions; and
      transmitting a graphical element of the output set of summary points and suggestions to a computing device, such that rendering the graphical element using presentation functions of the computing device causes displaying the graphical element at the computing device.

20. The computer system of claim 19, execution of the instructions further causing the computer system to perform:
   presenting a plurality of functions of the output set of summary points and suggestions via a graphical user interface and receiving input via the graphical user interface specifying a plurality of selections of the plurality of functions;

updating the one or more machine-learning models using the plurality of selections, the first text sequence, and the syntactic structure data associated with the first text sequence;

applying the one or more machine-learning models to update the output set of summary points and suggestions; and transmitting a graphical element of the updated output set of summary points and suggestions to a computing device, wherein rendering the graphical element using presentation functions of the computing device causes displaying the graphical element at the computing device.

* * * * *